(12) United States Patent
Mallavarapu

(10) Patent No.: US 11,436,044 B2
(45) Date of Patent: *Sep. 6, 2022

(54) ASYNCHRONOUS INTER-RUN COORDINATION MANAGEMENT

(71) Applicant: Precise.ly, Inc., Tiburon, CA (US)

(72) Inventor: Aneil Mallavarapu, Tiburon, CA (US)

(73) Assignee: Precise.ly, Inc., Tiburon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/534,417

(22) Filed: Nov. 23, 2021

(65) Prior Publication Data

US 2022/0164191 A1 May 26, 2022

Related U.S. Application Data

(60) Provisional application No. 63/117,261, filed on Nov. 23, 2020, provisional application No. 63/117,265, filed on Nov. 23, 2020, provisional application No. 63/234,908, filed on Aug. 19, 2021.

(51) Int. Cl.
*G06F 9/455* (2018.01)
*G06F 9/48* (2006.01)
*G06F 8/41* (2018.01)
*G06F 9/38* (2018.01)
*G06F 9/46* (2006.01)

(52) U.S. Cl.
CPC ............ *G06F 9/4856* (2013.01); *G06F 8/427* (2013.01); *G06F 9/3871* (2013.01); *G06F 9/3889* (2013.01); *G06F 9/461* (2013.01); *G06F 9/4881* (2013.01)

(58) Field of Classification Search
CPC ...... G06F 9/3871; G06F 9/3889; G06F 9/461; G06F 9/4881
See application file for complete search history.

(56) References Cited

U.S. PATENT DOCUMENTS

| | | | |
|---|---|---|---|
| 7,168,077 B2 | 1/2007 | Kim et al. | |
| 7,401,322 B1 | 7/2008 | Shagam et al. | |
| 7,565,640 B2 | 7/2009 | Shukla et al. | |
| 8,130,776 B1 | 3/2012 | Sundararajan et al. | |
| 8,141,069 B2 | 3/2012 | Koehler | |
| 8,332,809 B2 | 12/2012 | Mauceri et al. | |
| 8,930,312 B1 | 1/2015 | Rath et al. | |
| 9,256,761 B1 | 2/2016 | Sahu et al. | |

(Continued)

OTHER PUBLICATIONS

Balderrama, Javier Rojas, et al., "GinFlow: A Decentralized Adaptive Workflow Execution Manager", 2016 IEEE International Parallel and Distributed Processing Symposium.

(Continued)

*Primary Examiner* — Wissam Rashid
(74) *Attorney, Agent, or Firm* — Jeffrey Schox; Diana Lin

(57) ABSTRACT

A system and method for asynchronous, inter-run coordination, including: executing a set of runs; writing the run outputs to a shared coordination storage (e.g., a channel), and optionally determining whether a run should be suspended or restarted. When the run should be suspended, the run is suspended and an identifier for the run is stored in a run queue associated with the coordination storage. When a run should be restarted, the run is identified using the run identifier from the run queue and restarting using a value from the coordination storage.

21 Claims, 17 Drawing Sheets

(56) References Cited

U.S. PATENT DOCUMENTS

| | | |
|---|---|---|
| 9,633,051 B1 | 4/2017 | Maccanti et al. |
| 10,452,444 B1 | 10/2019 | Jibaja et al. |
| 10,756,816 B1 | 8/2020 | Dreier |
| 10,922,303 B1 | 2/2021 | Bruck et al. |
| 11,188,390 B2 | 11/2021 | Brebner |
| 2011/0066829 A1 | 3/2011 | Tye et al. |
| 2011/0296148 A1 | 12/2011 | Cain et al. |
| 2017/0371703 A1 | 12/2017 | Wagner et al. |
| 2019/0042513 A1 | 2/2019 | Fleming et al. |
| 2019/0361732 A1 | 11/2019 | McClure |
| 2020/0310845 A1* | 10/2020 | Liguori ................... G06F 9/54 |

OTHER PUBLICATIONS

Sephardi, Arvind , et al., "Pioneer: Verifying Code Integrity and Enforcing Untampered Code Execution on Legacy Systems", SOSP '05, Oct. 23-26, 2005, Brighton, United Kingdom.

Gajewski, Michal , et al., "Dynamic Failure Recovery of Generated Workflows", IEEE, pp. 1-5 (Year: 2005).

Lipari, Giuseppe , et al., "Resource Partitioning among Real-Time Applications", Proceedings of the 15th Euromicro Conference on Real-Time Systems, IEEE, pp. 1-8 (Year: 2003).

Massari, Giuseppe , et al., "Extending a Run-time Resource Management framework to support OpenCL and Heterogeneous Systems", PARMA-DITAM '14, Jan. 22, 2014, Vienna, Austria, ACN, pp. 21-26, (Year: 2014).

Qian, Hao , et al., "Emerald: Enhance Scientific Workflow Performance with Computation Offloading to the Cloud", IEEE, pp. 1-6 (Year: 2015), ICIS 2015, Jun. 28-Jul. 1, 2015, Las Vegas, USA.

Zhou, Lixin , "Approach of Graphic BPEL Workflow Debugging", 2009 International Conference on Computer Technology and Development. IEEE, pp. 63-67 (Year: 2009).

\* cited by examiner x is a "suspend variable"

ASYNCHRONOUS INTER-RUN COORDINATION MANAGEMENT

CROSS-REFERENCE TO RELATED APPLICATIONS

This application claims the benefit of U.S. Provisional Application No. 63/117,261 filed 23 Nov. 2020, U.S. Provisional Application 63/117,265 filed 23 Nov. 2020, and U.S. Provisional Application 63/234,908 filed 19 Aug. 2021, each of which is incorporated in its entirety by this reference.

TECHNICAL FIELD

This invention relates generally to the programmatic workflow management field, and more specifically to a new and useful technology for long-term programmatic workflow management in the programmatic workflow management field.

DETAILED DESCRIPTION

The following description of the embodiments of the invention is not intended to limit the invention to these embodiments, but rather to enable any person skilled in the art to make and use this invention.

Figure 1:
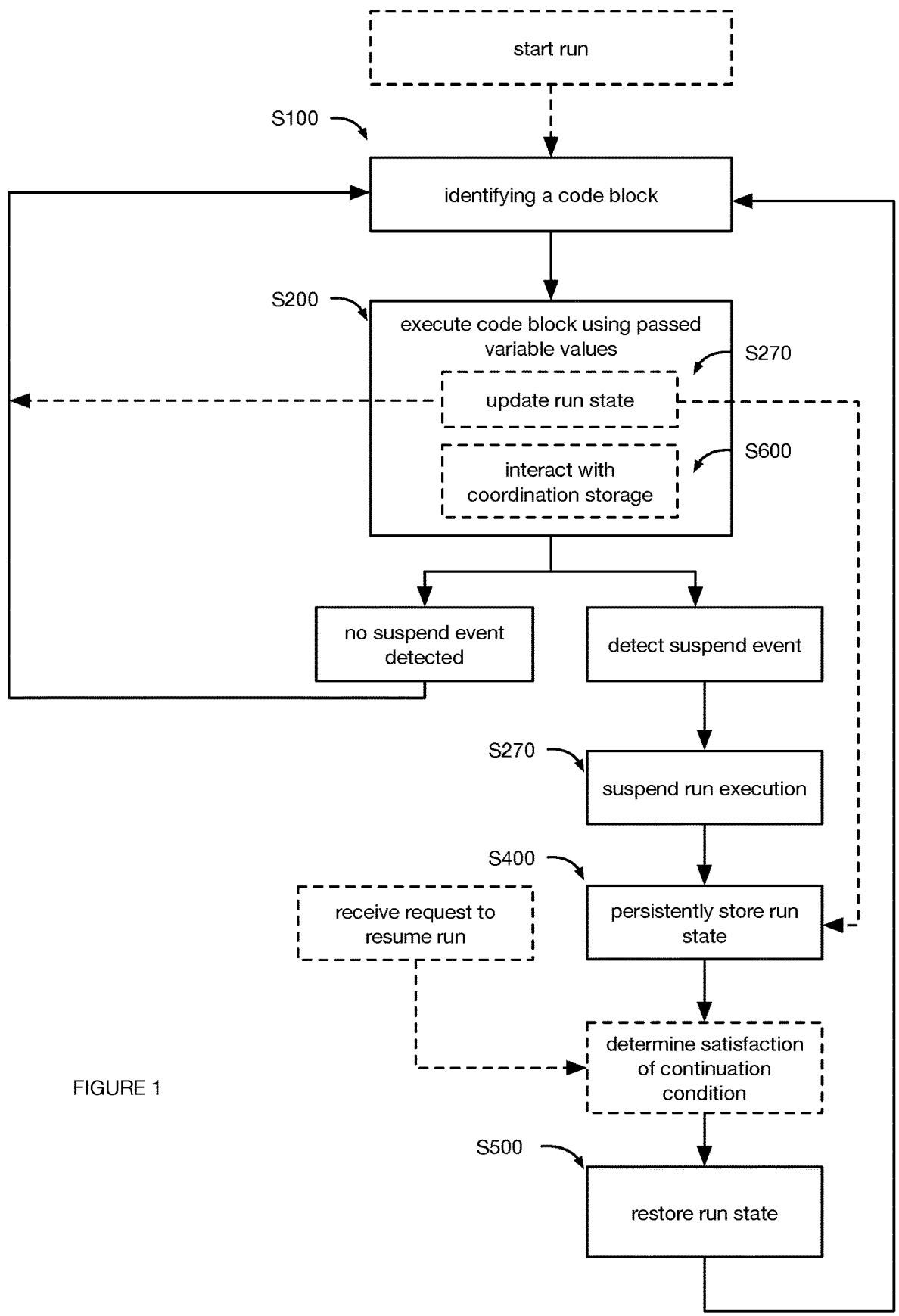
FIG. 1 is a flowchart representation of a variant of long-term workflow execution.
Figure 2:
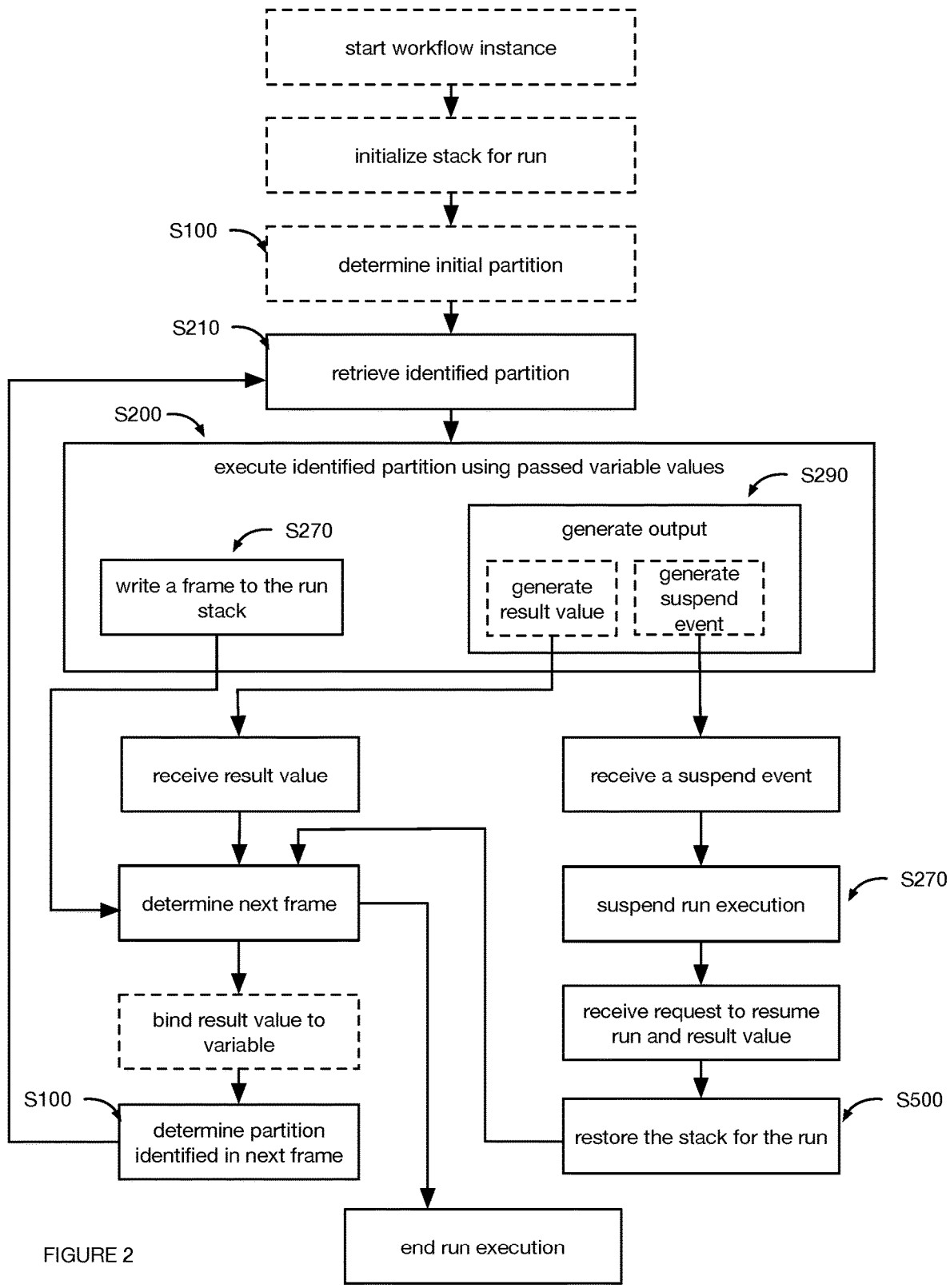
FIG. 2 is a flowchart representation of an example of long-term workflow execution.

The method for long-term programmatic workflow management can include executing a run, including iteratively: identifying a code block S100 and executing the code block using passed variable values S200; suspending the run S300; persistently storing the run state S400; and resuming the run S500 (e.g., examples shown in FIG. 1 and FIG. 2).

The method can optionally include coordinating between a set of runs S600, which can include, for a run: interacting with coordination storage according to the coordination method; when a set of suspension conditions are satisfied, generating a suspension event and storing an identifier for the run; and when a set of coordination continuation conditions are satisfied, retrieving an identifier for a run, retrieving a value from the coordination storage, and executing the identified run using the retrieved value.

Figure 3:
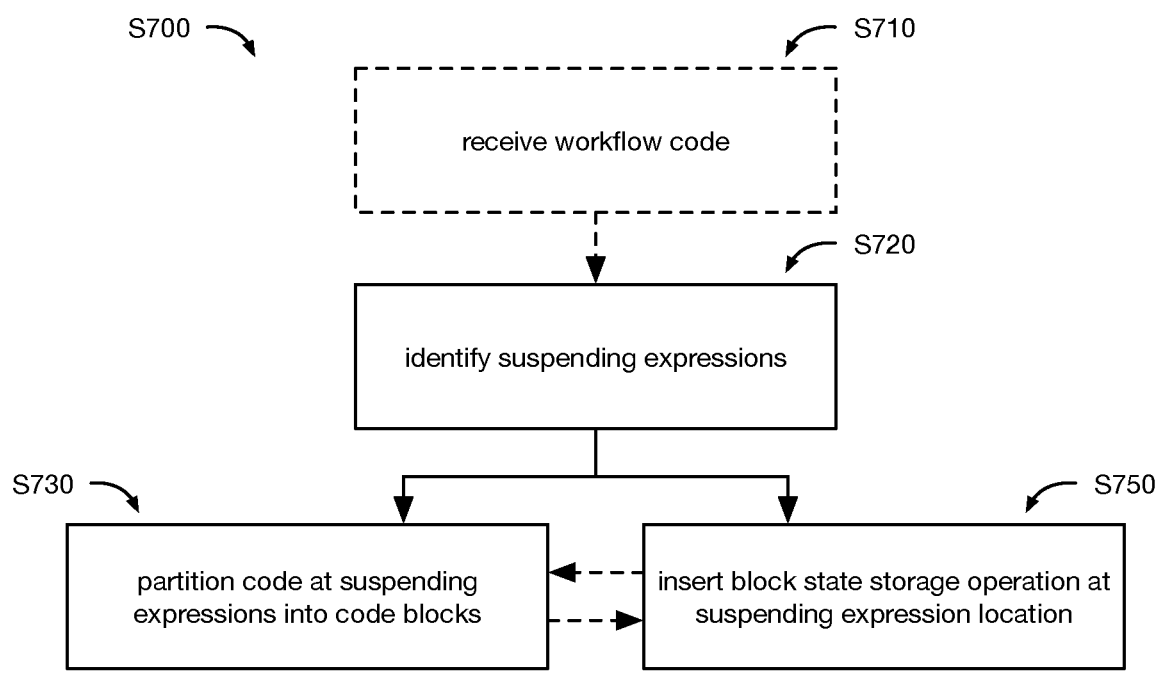
FIG. 3 is a flowchart representation of a variant of generating partitions for a workflow.

The method can optionally include generating a set of partitions for a workflow S700 ("flow"), which can include: receiving a programmatic representation of the workflow S710; identifying suspending expressions within the programmatic representation S720; partitioning the programmatic representation into a set of partitions S730; and optionally inserting block state storage operations at the suspending expression locations S750, example shown in FIG. 3.

The method enables real world event sequences (workflows) to be programmatically implemented. These event sequences can span long periods of time—hours, days, weeks, years, or decades—which exceed the practical capabilities of conventional programs, especially at scale. Furthermore, these event sequences oftentimes require inputs from external sources with unpredictable timing, which make conventional programs unsuitable for the application. Examples of real-world workflows can include: medical workflows, treatment workflows, chatbots, project management, and/or any other suitable workflow.

For example, a drug dose management workflow may require multiple rounds of: patient interviews, patient specimen preparation, remote lab work, specialist review, prescription ordering, patient symptom tracking, scheduling, periodic medical specialist visits, calculation of new drug dosing, and/or other processes. At each step, the workflow system may communicate with a real world entity, external to the workflow system, and the time between steps might span multiple days, weeks, months, or years, be dependent upon one or more of the prior steps, and involve complex coordination between multiple entities (e.g., the patient, multiple medical specialists, the lab, the pharmacies, etc.). During a workflow, entities participating in the workflow receive communication from the workflow system (e.g., user interfaces, alerts, API calls, etc.) and provide values to it (e.g., results of a lab measurement, heart rate, results of a physical exam). In another example, a manufacturing workflow may require managing deliveries from multiple suppliers to an assembler, then delivery to multiple customers, all at different times and different scales.

Conventional programs and/or programming languages cannot practically and scalably track and coordinate tasks and entities over the requisite timeframes. This is because conventional asynchronous programs maintain state in volatile memory, which would necessitate a computing system (e.g., a processor, a computer) to be dedicated to each individual workflow to track the respective workflow state—this is impractical and not scalable. Furthermore, the execution state (e.g., variable values and execution position) is lost when the computing system loses power or is repurposed, making conventional programs a poor solution for real-world workflow management. Thus, current programmatic approaches represent a barrier to developing complex, scalable workflows.

In contrast, this technology can enable scalable task and entity tracking over long timeframes (e.g., arbitrarily long periods of time). In variants, complex workflows can be represented as programs which can pause and resume computation between arbitrarily long periods without consuming CPU and volatile memory resources while waiting to receive input.

First, variants of the technology permits workflow developers to indicate points within a workflow where values are needed from real world sources where computational activity must pause for an arbitrarily long period of time until a value is provided from a source external to the workflow, where said value is used in the subsequent step of the workflow process.

Second, by storing the run state (e.g., execution state, programmatic state, etc.) to durable storage (e.g., persistent storage), this technology enables long-term execution state tracking, wherein the run state can be restored from the durable storage after any period of time, even after computing environment teardown.

Third, by breaking the code into pieces (e.g., code blocks, "partitions") at places where computation may pause (e.g., "suspending expressions") and storing the code piecemeal (e.g., in a set of code blocks), the technology enables the code blocks to be individually compiled and executed. This enables facile asynchronous execution resumption (e.g., by simply executing the next code block) without having to store or maintain the entire compiled workflow code and the execution state. This also enables the workflow to be executed extremely quickly—instead of compiling the entire workflow code, only the upcoming code block needs to be compiled. Alternatively, the workflow's code blocks can be stored in compiled form, such that individual runs (e.g., workflow instances) do not need to recompile each code block during run execution. This can save overall runtime memory and computing resources.

Fourth, long-term state tracking can be further enabled by assigning persistent identifiers to different code blocks (e.g., synchronous code blocks), which enables the next code block to be identified even after the original computing environment was shut down (e.g. after any temporary code addresses are wiped from volatile memory). Using persistent identifiers also allows the run state object to be extremely small—instead of storing the entire compiled workflow code, the run state object only needs to store identifiers (e.g., to the code block), values, and variables. In variants, no compiled code (e.g., no compiled code blocks) are stored in the run state. This small run state object enables multiple runs to be concurrently stored and persisted in limited memory, and also enables rapid run restoration (e.g., since the entire compiled code does not need to be restored). In examples, the technology stores a stack of frames cooperatively representing the run state, wherein each frame can include (e.g., only include) a persistent code block identifier (e.g., for a to-be-executed code block), a set of variables, and a set of variable values bound to at least a subset of the variables. In these examples, the run can be easily restored by restoring the run state object (e.g., the stack of frames), obtaining the code block identifier from the next frame, and executing the code block identified by the code block identifier.

Fifth, variants of the technology can enable different code blocks of the workflow to be heterogeneous (e.g., written in different languages, written by different authors, etc.), as long as each code block conforms to a standard run state storage interface (e.g., frames or block states conforming to a standard format). For example, the run state (e.g., the stack and other elements of the environment) can be translated to and from a representation in a "mother" language (e.g., Clojure EDN), and/or to and from a universal representation (e.g., JavaScript Object Notation). Workflow language heterogeneity can be further enabled by assigning persistent identifiers to each code block, such that the code block can be globally identifiable. Enabling heterogeneity can enable workflows to be easily extensible and flexible. For example, this allows for different programmers to program in their preferred language, and enables the most suitable language to be used to execute a given step of a workflow. The standard interface can be enforced through good practices, by a different partitioner for each programming language (e.g., automatically enforced), or otherwise enforced.

Sixth, variants of the technology can enable cross-run interaction by leveraging channels shared across a set of runs. For example, a run can write a value to a shared channel, while another run can read the value from the shared channel and use the value during execution of its code block. In variants, channel interaction can be regulated by a set of coordination methods (e.g., executing a set of coordination logic), which can enable complex, inter-run interactions.

Seventh, variants of the technology can verify the validity of run resumption calls (e.g., continuation calls), which can confer security and/or idempotency to the system (e.g., to protect against the run from being accidentally called multiple times).

Eighth, external entities may request a workflow system to start a workflow or continue an existing one, providing values to be introduced into the workflow computation. In this way, the technology arranges for a computer program (e.g., a workflow) to include inputs from external entities operating at long time scales, without needing to maintain program state in volatile memory between these interactions. This enables long-term workflow processes, as complex as arbitrary software programs, to be executed at scale. This also enables real-world events to be programmatically (e.g., automatically) processed.

However, the technology can confer any other suitable set of benefits.

The method can execute one or more runs. A run can be a long-term execution of an instance of a workflow. Runs can be iteratively executed and suspended, be continuously executed or persisted, and/or otherwise managed. Run execution can include: optionally restoring a run state, and executing one or more code blocks of a workflow. The code blocks can be executed: serially, in parallel (e.g., on different threads), contemporaneously, and/or in any other suitable order. The code block execution order can be specified by the workflow, by the run state, and/or otherwise specified. Run suspension can include storing the run state to persistent storage and optionally shutting down the process executing the run (e.g., by shutting down the computing environment, etc.). However, the run can be otherwise configured.

A run is preferably associated with a run identifier (e.g., different from the workflow identifier), which can be used to retrieve the run information (e.g., the run's state, and other information associated with the run).

In variants, execution of a run can include a series of runlets separated by suspension events (e.g., one or more runlets, executing in series or in parallel), or be otherwise configured. A runlet can include the series of one or more code blocks that can sequentially execute (e.g., without external input) between suspending events, or be otherwise defined. A suspending event is preferably a point at which the workflow requires external input (e.g., a "SUSPEND!" operation), but can be otherwise defined. Invoking a suspend operator (e.g., the SUSPEND! operator) preferably returns a suspend signal, which is preferably returned by the code blocks in which it is generated (e.g., to signal that the run should suspend). The suspend signal is preferably a data structure which optionally may contain additional context information ("suspend context") governing the conditions under which the run may resume.

The method can be implemented using one or more workflows. A workflow can be a set of operations which can include or make reference to logical tests and conditional logic, calculations, processes, asynchronous events, notifications, user interfaces, and entities (e.g., users, robots, APIs, etc.), and/or other components that cooperatively deliver a result (e.g., a treatment), or be otherwise defined. The workflow components within a workflow can be dependent upon another workflow component, be interdependent, be independent, and/or be otherwise related to the other workflow components. Interactions between the computing system implementing the workflow and entities participating in the workflow can be separated by wait times on the order of milliseconds, seconds, minutes, hours, days, weeks, and/or years.

A workflow can include or reference other workflows. A workflow can be identified by a workflow identifier, which can include a workflow name (e.g., "DiabetesManagement-Workflow"), the workflow version, hash of the workflow's AST, and/or any other suitable identifier.

A workflow is preferably programmatically defined (e.g., in code, by a programmatic representation, etc.), but can alternatively be defined using a graph (e.g., of tasks, entities, processes, etc. connected by one or more conditional edges) or otherwise defined. The programmatic representation of the workflow (programmatic workflow representation) is preferably code (e.g., a monolithic block of code), but can be a set of related code segments, or be otherwise represented. The programmatic workflow representation can be received from a user (e.g., programmed in any programming language) or otherwise determined.

A workflow can include a series of expressions (e.g., code expressions), cooperatively forming operations, that can be compiled and executed. An expression can include: literals (e.g., numbers, strings, maps, vectors, etc.), symbols, function calls, a sequence of expressions, and/or be otherwise defined. Operations can include a set of expressions that, when executed, perform a functionality, or be otherwise defined.

The workflow can include one or more suspending expressions within its code. A suspending expression can be a point where code execution is explicitly suspended (e.g., terminated) or paused; a point where code execution could be suspended or paused; an asynchronous operation from the remainder of the code block; or otherwise defined. A suspending expression (SE) can be: a point within the code at which execution can pause for an arbitrarily long period of time, a code expression that executes—or requires an output from—a process external to the programmatic representation's function from which the partition is derived (e.g., a user's interaction with a user interface element, the results of processing a specimen in a lab, an input from another computational process, etc.), a suspending operation, or be otherwise defined. For example, a suspending expression can be: a function call, a call to another workflow, a predetermined expression (e.g., a suspension command, "SUSPEND!", etc.), a block of code which contains a suspending expression, a function call which may result in execution of suspending expressions, and/or any other suitable expression within the workflow code.

Suspending operations can include expressions that definitively suspend operation (e.g., a "SUSPEND!" call; a request for external input; etc.). Suspending operations can also be associated with (e.g., output) a suspend signal, which can suspend further execution of: the partition, the runlet that the partition is part of, the run (e.g., workflow instance), and/or be otherwise used. However, suspending operations can be otherwise defined.

Suspending expressions can include suspending operations, and can include expressions that have a possibility of suspending (e.g., a conditional expression with a suspend operation in one branch and a non-suspending expression in another branch; calls to other functions; invocation of functions which contain suspending expressions; invocation of workflows; calls to a third party API; expressions with suspending subexpressions; programmatic blocks which contain suspending expressions, loops which contain suspending expressions; etc.), or be otherwise defined.

A workflow is preferably associated with a set of code blocks (e.g., partitions, functions, synchronous blocks, etc.), but can additionally or alternatively be associated with and/or represented as: workflow code (e.g., a series of expressions), a graph (e.g., multigraph, acyclic graph, cyclic graph, etc.), and/or otherwise represented.

The code block set (set of code blocks) can include one or more code blocks. The code blocks within the code block set can be arranged in a series (e.g., related according to order of evaluation or execution), be unordered, be arranged in subsets, be hierarchically related, and/or have any other suitable relationship. The code blocks within a code block set are preferably generated from the same monolithic workflow code, but can alternatively be generated from multiple different pieces of code or otherwise generated.

The code blocks are preferably automatically generated (e.g., partitioned) by the system from the workflow code (e.g., monolithic code), but can alternatively be manually generated (e.g., manually partitioned), written block by block, or be otherwise generated. The code blocks are preferably generated before workflow execution (e.g., by a partitioner) and persistently stored, but can alternatively be generated during workflow execution (e.g., by a runtime environment, etc.) or at any other suitable time. The code block sets are preferably persistently stored, but can alternatively be temporarily stored. The set of code blocks can be stored in: a database, a file system, a lookup table, and/or any other suitable repository. The repository can be: part of the platform, be a third party repository (e.g., a cloud repository controlled by the user; an on-premises repository controlled by the user; etc.), and/or be any other suitable repository. The code blocks can be stored: uncompiled, compiled, and/or otherwise stored.

The code blocks of a workflow can be written in the same or different language, by the same or different author, using the same or different format, for the same or different machine (e.g., computing environment; processing unit, such as a GPU, CPU, TPU, etc.; etc.), and/or otherwise related.

Each code block is preferably identified by a code block identifier (e.g., partition identifier), wherein the code block identifier can be persistent (e.g., assigned by the partitioner), temporary (e.g., assigned by the compiler), and/or otherwise persist. The code block identifier is preferably unique (e.g., locally unique within the set, globally unique across all workflows), but can alternatively be nonunique.

Each code block within the set preferably includes a different code segment (e.g., series of alphanumeric characters) of the workflow code (example shown in FIG. 6), but can alternatively include overlapping segments of the workflow code. The code block can be or include: a function, function calls (e.g., to other functions in the workflow code, to global functions from a shared library, coordination method calls, etc.), workflow calls, variable definitions, variable assignments, statements, expressions, operations, and/or any other suitable syntax.

Each code block can optionally include one or more state push operations, which function to push a block state to run storage (e.g., run memory), wherein the set of block states stored in run storage can cooperatively define the run state. The state push operations can be located (e.g., replace, precede, follow, etc.) at the positions of asynchronous operations within the code block, of suspending expressions, at a predetermined position (e.g., code block beginning, code block end, etc.), and/or at any other suitable location within the code block. The state push operation can write the block state (at the state push operation position) to the run storage and/or any other suitable information to the run storage. The block state can include: an identifier for the next code block, a set of output variables (e.g., optionally including suspension variable(s)), a set of values (e.g., stored in the run storage, global memory, etc.), bindings between the output variables and values, an identifier for the code block writing the block state, a write time, any information needed to resume run execution, and/or any other suitable information. Examples of block states can include: stack frames, records (e.g., in a queue, array, or other storage structure), and/or any other storage object. The information pushed in the block state is preferably predefined (e.g., by the code of the state push operation), but can be otherwise defined. In a specific example, new variable-value bindings generated by a given code block are captured in the block state, so the number of bindings constantly grows for each subsequent code block within a code body; bindings are eliminated when a block state is read from the run storage. In another specific example, code blocks can pass only bindings that are needed by subsequent stack frames. However, bindings can be otherwise passed between code blocks.

The code block can optionally include a suspension command (e.g., that generates a suspension signal), which suspends execution of the overall run (e.g., the workflow instance). Each code block preferably includes a set of synchronous operations that operate without pausing or suspending (e.g., execute atomically), but can alternatively include one or more asynchronous operations. In one example, each code block only includes synchronous operations.

Each code block can additionally or alternatively be associated with: a set of input variables (e.g., wherein the values bound to the input variables are used to execute the code block), a set of output variables (e.g., including variables bound to values and/or unbound variables), a set of variable values, a set of execution conditions (e.g., all input variables must have bound values before the block is executed, etc.), a set of dependencies (e.g., parent code block identifier, child code block identifier, etc.), and/or any other suitable set of information.

The variables can include a variable name (e.g., only a variable name, nonlimited to a variable name, etc.), a value, binding, or other data. The variable can be: the variable name used by the programmatic representation of the workflow (e.g., locally unique for the function or partition); autogenerated (e.g., unique within the workflow); and/or otherwise constructed. The variables can be: only the variables used in the code block, all variables from the programmatic representation's function that the partition is derived from, all variables defined up to the code block's location within the programmatic representation's function that the partition is derived from, global variables, and/or include other partition variables.

During execution, each input and/or output variable can be bound to a value. The value can include alphanumeric values, symbolic values, a hashmap, an array of values, and/or otherwise defined. The values can be specific to a code block execution instance, specific to a run, specific to a run storage instance (e.g., a stack frame), globally shared, or otherwise shared. The values can be defined through run execution, code block execution, by an external system (e.g., wherein the value is bound to a suspend variable), and/or otherwise defined. The values can be bound to variables by bindings, which bind (e.g., associate) a partition value with the partition variable. The bindings can be: an association, an assignment, a pointer, a mapping, and/or be any other suitable data structure. In variants, the bindings (and/or the values bound to a given variable) can be stored in the run storage (e.g., in the run state). References to "values" herein can refer to values or to bindings as defined above.

Figure 8A:
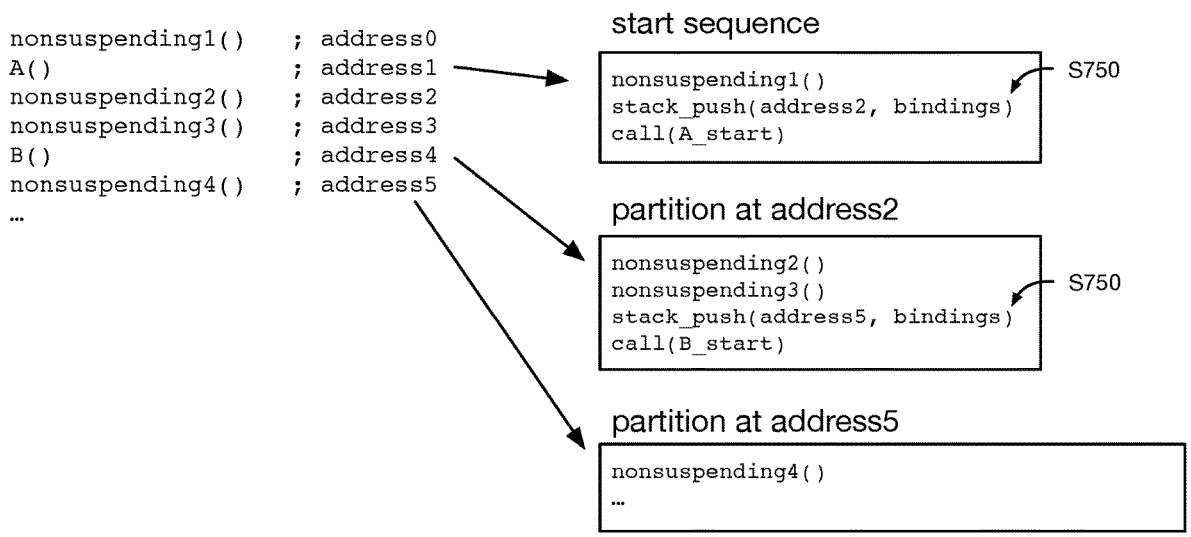
FIG. 8A is a schematic representation of an example of generating partitions for a sequence of expressions.
Figure 8B:
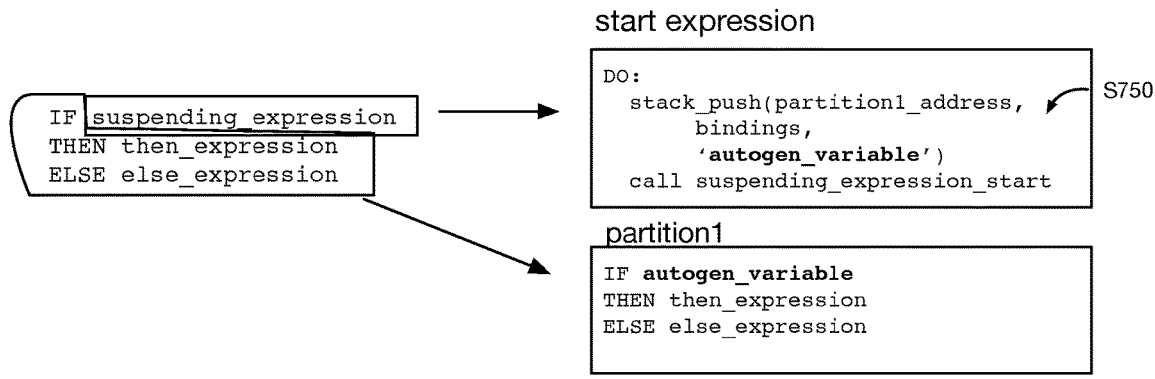
FIG. 8B is a schematic representation of an example of generating partitions for branching logic.
Figure 8C:
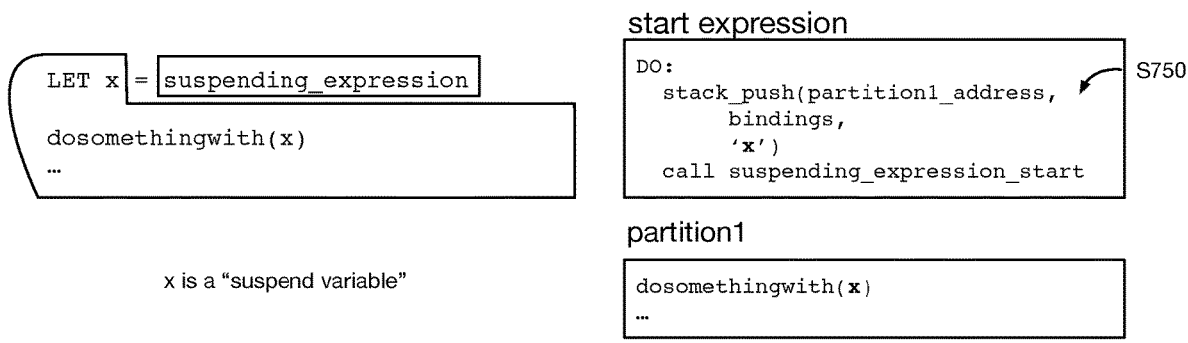
FIG. 8C is a schematic representation of an example of generating partitions for variable assignments to suspending expressions.

The input and/or output variables for a given code block can optionally include one or more suspend variables, which define variables to be bound to result values that are received from an external source. Suspend variables can be defined within the state pushed to run storage, and remain unbound (e.g., lack bound values) until a value is received for said variable (e.g., wherein suspend variables in an output variable set are unbound; wherein suspend variables in an input variable set are bound by the time the code block is being executed; etc.). The suspend variables preferably include a variable name (e.g., only a variable name, nonlimited to a variable name, etc.), but can include a value or other data. The suspend variables are preferably associated with (e.g., generated from, replace, represent, etc.) a suspending expression (e.g., associated with a suspending expression that can receive input from a non-workflow source), but can be otherwise defined. The suspend variables can be automatically determined (e.g., based on the function name, the variable name, the suspending expression, a global workflow index, etc.), provided explicitly by the workflow programmer, or otherwise determined (examples shown in FIGS. 8B and 6C). The values bound to suspend variables (suspend variable values) can be: received from an external source, be default values, be received from another run, be received from another workflow, be received from another code block, and/or received from any other suitable source.

In a first variation, a code block is a partition (e.g., partition function). The partition is generated before workflow execution from the monolithic workflow code, is identified by a persistent partition identifier, and is persistently stored in association with the workflow identifier. Each partition can include one or more workflow components (e.g., code blocks), and can optionally include a set of state push operations (e.g., stack frame push operations, block state write operations, block state push operation, block state storage operation, etc.), and/or other components.

A partition can include functions or procedures which take a set of variable values (e.g., a map of symbols to values, representing variable bindings) as arguments and execute partition code, or be otherwise defined. The partitions can be related according to order of evaluation or execution (e.g., define a set of dependencies), or can be otherwise related. Information for sequencing the runtime execution of partitions and/or invoking suspending expressions may be stored outside of the partition (e.g., in a partition graph), stored within the partitions themselves (e.g., in the state push operations), and/or otherwise stored.

A partition can include a block of code that is separated from adjacent partitions by a suspending expression (e.g., within the workflow code, within an AST of the workflow code, within an expression tree representing the workflow code, etc.), or be otherwise defined.

In a first embodiment, a partition is defined from an arbitrary location in code by all expressions arranged in order of execution from the arbitrary code location up to either the first suspending expression or the final expression in a sequence of expressions. In a first example, a partition is defined from the first expression in a workflow until the first encountered suspending expression. In a second example, a partition is defined after a preceding suspending expression and ends at (e.g., includes) the next suspending expression. In a third example, a partition is defined after a preceding suspending expression and ends at the final expression in a sequence of expressions. In a fourth example, a partition is defined from the first expression in a workflow until the final expression in the sequence of expressions in the workflow. However, the partition can be defined from any other suitable arbitrary location.

In a second embodiment, the partition may be defined to be bounded by a first and second suspending expression, and may include all, part of, or a related expression of the first suspending expression and all, part of, or a related expression of the second suspending expression. In a first example, the partition may include a value-generating expression of the preceding suspending expression, and may include the starting expression of the final suspending expression. However, the partition can be otherwise defined.

One or more partitions can include an operation to add a stack frame (e.g., the block state) to the stack (e.g., the run storage, via a "block state push operation"; etc.). This can function to permit the runtime environment to resume execution at the next appropriate code location, such as a partition identifier for the separated-out successive partition or suspending expression. The one or more partitions can also include a call to invoke a suspending expression. Alternatively, a partition may include no operations to add stack frames or invoke suspending expressions.

Each partition can be identified by a unique partition identifier (e.g., address, code location, etc.), wherein the system can store a map of partition identifiers ("partition map"), but can be otherwise identified and stored. The partition identifier is preferably persistent (e.g., outlives the process that created the partition identifier, such as the partitioner), but can alternatively be temporary.

Each partition of the set can include a set of partition variables, which define the variables for a partition. The partition variables preferably include a variable name (e.g., only a variable name, nonlimited to a variable name, etc.), but can additionally or alternatively include a value, binding, or other data. The partition variable can be: the variable name used by the programmatic representation of the workflow (e.g., locally unique for the function or partition); autogenerated (e.g., unique within the workflow); and/or otherwise constructed. The partition variables can be: only the variables used in the partition, all variables from the programmatic representation's function that the partition is derived from, all variables defined up to the partition's location within the programmatic representation's function that the partition is derived from (e.g., local and/or global variables), and/or include other partition variables.

During execution, each partition variable can be bound to a partition value by a partition binding. The partition value can include alphanumeric values, symbolic values, a hashmap, an array of partition values, and/or otherwise defined. The partition values can be specific to a partition execution instance, specific to a stack frame, globally shared, or otherwise shared. The partition values can be defined through partition execution, by an external system (e.g., wherein the partition value is bound to a suspend variable), and/or otherwise defined. The partition bindings bind (e.g., associate) a partition value with the partition variable. The bindings can be: an association, an assignment, a pointer, a mapping, and/or be any other suitable data structure. In variants, the bindings (and/or the partition values bound to a given partition variable) can be stored in the pushed stack frame. References to partition values herein can refer to partition values or to partition bindings as defined above.

One or more partitions can also include suspend variables, which define the variables to be bound to result values that are received from an external source. The suspend variables preferably include a variable name (e.g., only a variable name, nonlimited to a variable name, etc.), but can include a value or other data. The suspend variables are preferably associated with (e.g., generated from, replace, represent, etc.) a suspending expression (e.g., associated with a suspending expression that can receive input from a non-workflow source), but can be otherwise defined. The suspend variables can be transformed to partition variables when a value is received for the suspend variable, or be otherwise treated. The suspend variables can be automatically determined (e.g., based on the function name, the variable name, the suspending expression, a global workflow index, etc.), provided explicitly by the workflow programmer, or otherwise determined (examples shown in FIGS. 8B and 6C).

Each partition can be configured to receive values for a set of partition variables and execute the respective partition using the bound partition values. The partition can additionally be configured to push a stack frame (e.g., representative of the partition state and/or run state) to a stack for the run, pop stack frames from the stack, and/or perform other functionalities.

A partition can include: the partition's code (e.g., compiled or uncompiled), a stack push operation (example shown in FIG. 6), a stack pop operation, one or more stack push operations, and/or other code. A partition can include or exclude the delineating suspending expression(s) (e.g., the suspending expression defining the beginning of the partition; the suspending expression defining the end of the partition; etc.), or include a version thereof. A partition can be called: by another partition (e.g., another code partition can call a partition, using the partition's address; examples shown in FIG. 7, FIG. 8A, FIG. 8B, and FIG. 8C), based on a stack frame (e.g., wherein the runtime environment can call the identified partition), based on it being the starting partition of a workflow (e.g., wherein the runtime environment starts a workflow, as instructed by a client), and/or otherwise called.

Each partition can define one or more stack push operations (e.g., state push operations) located throughout the partition (e.g., at the beginning, middle, and/or end of the partition, at different branches of branching logic, etc.). The stack push operation can push a stack frame to the stack, or perform other functions. The stack push operation can suspend further partition execution, not suspend further partition execution (e.g., wherein subsequent partition processes are not dependent on the output of the stack push operation), and/or otherwise influence partition execution. Each stack push operation is preferably defined at the location of a suspending expression in the programmatic workflow representation (e.g., a stack push operation replaces or is inserted before each suspending expression), but can be defined at the beginning of a function, end of a function, or otherwise defined.

The stack frame can include all information needed to resume run execution, but can alternatively include more or less information. The stack frame can include: an identifier for the next partition (e.g., associated with the next partition to be evaluated; unique identifier; nonunique identifier; etc.), the partition values bound to the partition's partition variables (e.g., at the time of the stack push), and optionally a suspend variable, wherein the next partition is executed using the result value bound to the suspend variable when said result value is received. The values for the passed variables (e.g., the partition values, the result value) can be stored: in the stack frame, in global memory (e.g., wherein the current variable values are retrieved from global memory when the frame is popped), or otherwise stored.

Because the partitions are hierarchical (e.g., have evaluation dependencies), the resultant partitions can also be hierarchical. The next partition can be the partition for: a child partition of the current partition, the next partition to be evaluated, and/or otherwise determined. The identifier for the next partition is preferably hardcoded into the partition (e.g., determined when the partition is created), but can alternatively be dynamically determined (e.g., looked up within a partition dependency graph maintained by the system) or otherwise determined.

The partitioning method described herein (examples shown in FIG. 3, FIG. 4, FIG. 12, FIG. 13, and FIG. 14) can be applied to enable use of many programmatic constructs in workflow programming, These include branching logic, sequences of expressions, looping constructs, closures, exception handling and recovery, variable binding, object-oriented programming, and other types of expressions. While only a subset of them are described here, a practitioner skilled in the art will be able to define appropriate specialized partitioning functions for arbitrary programmatic expressions.

A partition can be identified by a partition identifier (e.g., symbolic address, or "address"), which is used to retrieve and execute the partition. The address can be unique within the partition set associated with a workflow, be globally unique, be a shared identifier, and/or be otherwise identified. In an example, the partition identifier can be generated using: the workflow identifier (e.g., the name of the workflow), the partition's address within the code (e.g., partition location, parent function name, etc.), the expression name, an incremented nonce, and/or any other suitable information. The partition identifier can be the same as the partition identifier, which can be the same as the address, but can alternatively be different.

Figure 6:
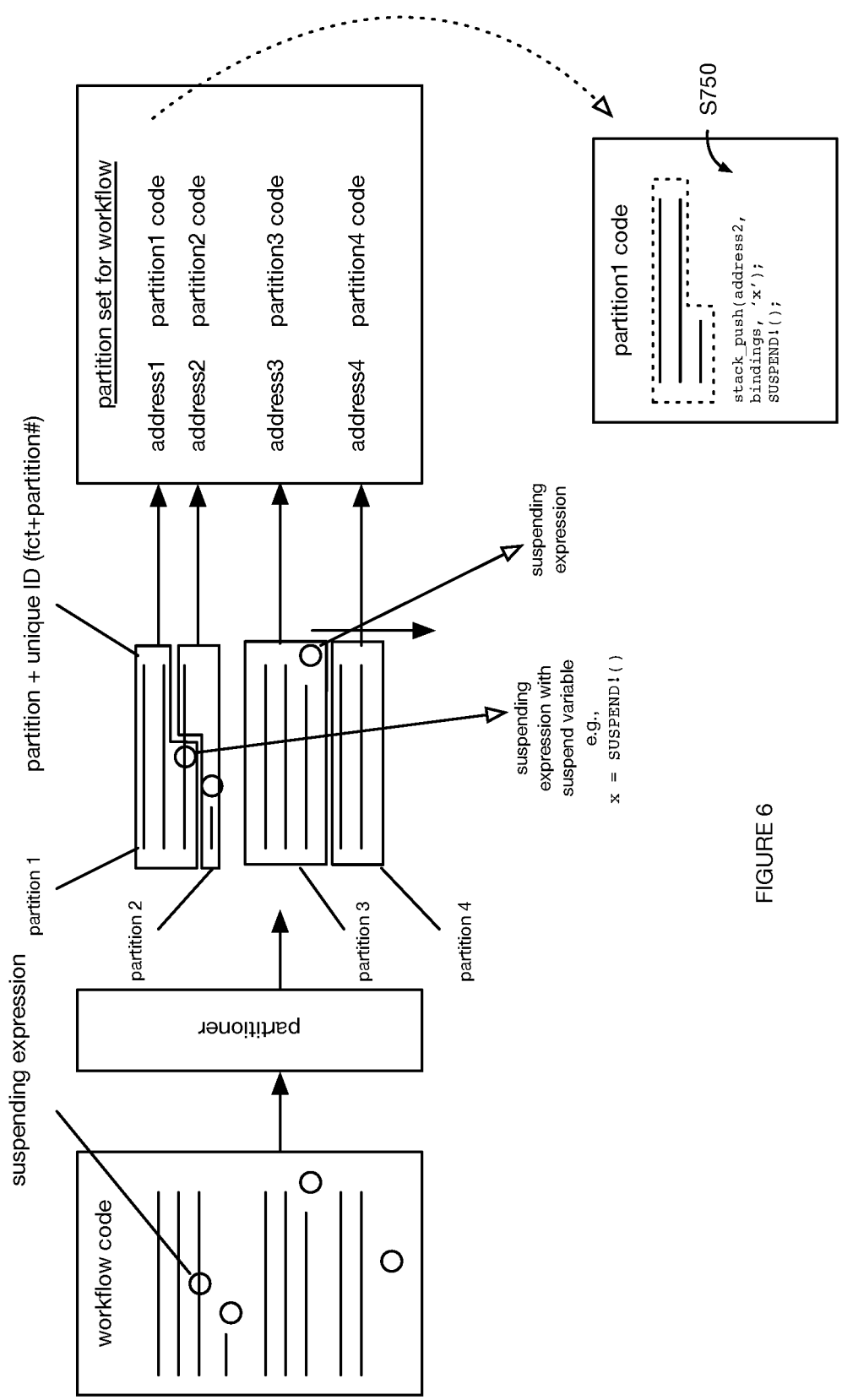
FIG. 6 is a schematic representation of an example of generating partitions for a workflow.
Figure 7:
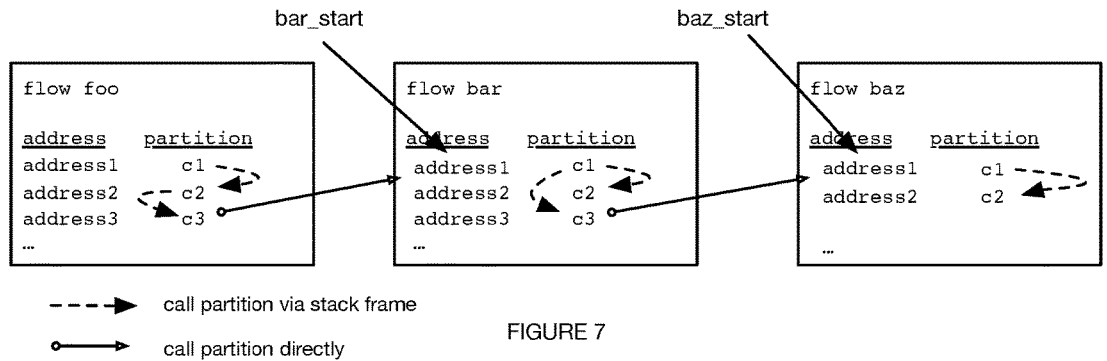
FIG. 7 is a schematic representation of partition relationships for a nested workflow call.

The set of partitions for a given workflow is preferably stored in a database or lookup table (e.g., indexed by the partitions' identifiers; example shown in FIG. 6) or in a defined directory structure which allows rapid loading and execution (e.g., a web server), but can be otherwise stored. The set of partitions are preferably stored in persistent storage, but can be otherwise stored. Each partition can be stored as compiled code or uncompiled code. In operation, different partitions from the set can be called and independently executed, such that different partitions from the same workflow can be executed: at different times, on different computing systems, for different instances of the same workflow, and/or otherwise executed.

In a second variation, a code block is a block of synchronous operations from the workflow code, as determined by a runtime environment during workflow code execution. In operation, the code block writes a run state to run storage. In an illustrative example, the code can write a promise to an event queue.

However, the code blocks can be otherwise defined.

The method can also be used with a library that provides global functions and/or modules accessible by all or a portion of the runs (e.g., workflow instances). The library can be stored by the platform, in a cloud repository, in nonvolatile computer readable media, and/or otherwise stored. The global functions and/or modules can be identified by reserved names or by any other suitable identifier. The global functions and/or modules can be called by code blocks, external systems (e.g., clients), and/or any other suitable component, and can be executed on the calling component's runtime and/or computing environment.

Examples of global functions and/or modules can include: a run function, persist function, continue function, coordination functions, a partitioner, an expiration manager, a disk storage manager, and/or any other suitable set of functions and/or modules.

The run function (e.g., run loop) can: call and/or execute a code block, check the output of the code block, and selectively orchestrate subsequent code block operation. In an example, orchestrating subsequent code block operation can include: suspending the run (e.g., calling the persist function) when the code block output is a suspend signal (e.g., suspend command) or when the run storage is empty, and identifying the next code block to execute (e.g., according to predefined and/or standard state or frame selection logic) based on the run state (e.g., based on the block states stored in run storage) when the output is not a suspend signal or command. However, the run function can be otherwise configured.

The persist function can store the run state (e.g., information in the run storage) to persistent storage, shut down (e.g., tear down) the process and/or the computing environment executing the run, return run information to an external system (e.g., return a run identifier, a suspend variable, a set of default restart conditions, etc. to a client), and/or perform other functions. The persist function can be called by the run function in response to determination that a code block has output a suspend signal, or be otherwise called. In an illustrative example, a code block outputs a suspend command, which is interpreted as a suspend signal by the run function. The run function then calls the persist function, which suspends the run. The persist function can be a subfunction of the run function, or be a separate function. However, the persist function can be otherwise implemented.

The continue function can set up a new computing environment (e.g., container, virtual machine, bare metal system, etc.) or process, restore the run state for a run identified in the call, and/or call the run function with a run identifier, wherein the run function can continue run execution (e.g., based on block states read off the run state). In an illustrative example, the continue function restores the run state (e.g., by calling the run function with a run identifier), on a pre-existing computing environment.

Figure 16:
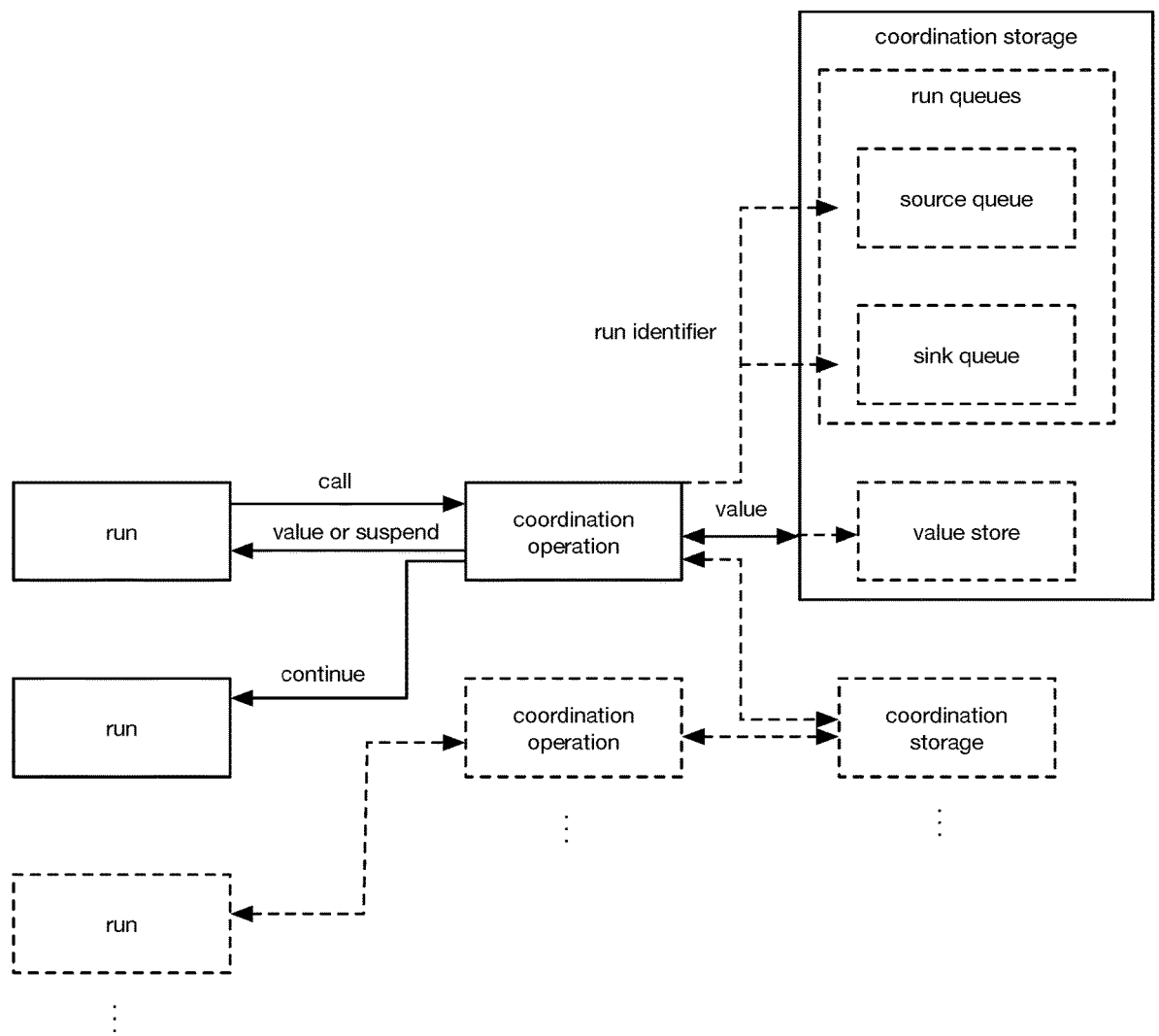
FIG. 16 is a schematic representation of an example of a system for cross-run coordination.

The coordination operations (e.g., coordination methods, coordination functions, coordination modules, etc.) can control inter-run coordination and/or perform other functions (example shown in FIG. 16). For example, the coordination operations can regulate value read/write to shared storage (e.g., coordination storage), can generate suspend signals (or instruct runs to generate suspend signals), can resume runs (e.g., call the continue function with a run identifier), can monitor shared storage state, and/or perform any other suitable functionality. Run value read/write can be controlled based on value read logic and/or value write logic, respectively. The value read logic and/or value write logic can be: predefined, defined by a user (e.g., the user executing the set of runs), and/or be otherwise defined. Examples of value read logic and/or value write logic can include: FIFO, FILO, LIFO, LILO, reading values addressed to the reading run, reading values written by a specific run, and/or any other suitable logic. Run suspension and/or continuation can be controlled based on whether a set of shared storage conditions are met, whether a set of conditions for each of a set of run queues (e.g., sink run queue, source run queue, etc.) are met, whether any other suitable set of conditions are met, and/or based on any other suitable cross-run control logic. The set of shared storage conditions can include: a parameter (e.g., number, age, value, etc.) of the unread values in the shared storage satisfying (e.g., meeting, exceeding, or falling below) a threshold, a parameter of all values written to the shared storage satisfying a threshold, and/or any other suitable condition. The set of run queue conditions can include: a parameter (e.g., number, age, value, etc.) of the current runs in the run queue satisfying (e.g., meeting, exceeding, or falling below) a threshold, and/or any other suitable condition (e.g., run resumption condition; run suspend condition; etc.). However, any other suitable coordination logic can be used.

Each coordination operation can control interaction between one or more runs and one or more shared storage instances (e.g., "channels"). The shared storage can be: a buffer, a queue, a stack, an array, a stream (e.g., an event stream), and/or any other suitable storage object. The shared storage instances can additionally or alternatively be associated with a set of run queues, which can store runs having one or more characteristics (e.g., suspended runs, runs attempting to write to the shared storage, runs attempting to read from the shared storage, etc.). The run queues are preferably specific to a shared storage instance, but can alternatively be shared across shared storage instances. The shared storage instances can be identified in the coordination operation call (e.g., by address, by URL, by alphanumeric name, etc.), be a default shared storage instance (e.g., for the set of runs, associated with the client, etc.), and/or be otherwise identified.

Examples of coordination operations can include: put (e.g., writing to the shared storage), take (e.g., reading from an identified shared storage), takeany (e.g., reading from any of a set of shared storage instances), and/or other coordination operations. In an illustrative example, a put function call from a run (e.g., with a value and a shared storage identifier) can: write the value to the shared storage (e.g., using a coordination function or other form of write logic); when a "sink" run queue is not empty, remove a run identifier from the "sink" run queue, remove a value from the shared storage (e.g., using predefined value read logic), call the continue function with the run identifier and the value, and optionally return a null value or other value; and when the shared storage satisfies a predetermined set of shared storage conditions, add the run's identifier to a "source" queue associated with the channel identifier and generate a suspend signal for the run, wherein the run is suspended responsive to the suspend signal. In a second illustrative example, a take function (e.g., called by a code block of a run) can: determine a shared storage state; when the shared storage is empty, add the run identifier to the "sink" queue and generate a suspend signal for the run, wherein the run is suspended responsive to the suspend signal; and when the shared storage is not empty, remove a value from the shared storage (e.g., using the predefined value read logic) and return the value to the run. In this example, the take function can optionally determine that the "source" queue is not empty, remove a run identifier from the "source" queue (e.g., for a previously-suspended run), and call the continue function with the run identifier to resume the previously-suspended run. In a third illustrative example, the example is similar to the second illustrative example, except that the run can attempt to retrieve values from any of a set of shared storage instances. However, any other suitable set of coordination operations can be used, with any other suitable set of shared storage read/write logic, run continue logic/suspend logic, and/or other logic.

The partitioner functions to convert the workflow code into partitions (example shown in FIG. 6). The system can include one or more partitioners. A partitioner can be generic to all programming languages, specific to a given programming language, and/or otherwise defined. A partitioner can be generic to all expression classes, specific to an expression class (e.g., conditional expressions, functions, looping constructs, branching constructs, etc.), be specific to a programming language, and/or otherwise configured. In operation, the partitioner can: analyze the workflow code, identify suspending expressions, partition the workflow code based on the evaluation location of the suspending expression, identify suspend variables which capture results of suspending expressions and make these variables available for processing by the runtime environment, and/or perform other operations. In one example, the partitioner segments the programmatic workflow representation at points where execution needs to wait for input (e.g., external to the function or workflow), and inserts a state push operation just before the suspending expression, wherein the state push operation includes the address where execution should resume when the suspending expression's value is available. In another example, a generalized partitioner can take any expression, determine which specific partitioner should be used to partition said expression, and call that partitioner, passing the expression (and other arguments, such as the address, parameter list, etc.) to it. Each partitioner may call the general partitioner on the subexpressions of the expressions it is partitioning. However, the partitioner can partition the code in any other suitable manner, and/or the code can be partitioned by any other suitable module.

The expiration manager functions to determine whether a continuation condition associated with a run has been met (e.g., whether the run suspension has expired), and to resume the run when the continuation condition has been met (e.g., by calling the continue function). This can function to automatically resume runs, providing a convenient means for implementing timed events during a workflow. Each expiration manager instance can be associated with (e.g., monitor) one or more runs. The continuation condition is preferably specified by or is associated with a run, more preferably specified by a suspend signal or code block from the run, but can be a set of default continuation conditions and/or be otherwise defined. For example, a run can be associated with a continuation condition (e.g., output by a code block, associated with a suspend signal, etc.) that specifies that the run should be resumed after 5 days (e.g., of inactivity). In another example, all runs can be automatically resumed after 1 year, unless the run specifies otherwise. Examples of continuation conditions can include: timer expiration, wall clock time satisfaction, an external event being met (e.g., independent of a client calling the run with the return value; receipt of a value from a third party, webhook triggering, etc.), and/or any other suitable set of conditions. In an illustrative example, the continuation condition can be an arbitrary external monitored condition (e.g., a global pandemic is detected), wherein the associated runs are automatically restarted when the external monitored condition is met.

The disk storage manager functions to save run states to persistent storage. The disk storage manager can be called by the persist function, by a code block, by the run loop (e.g., to periodically save run state versions, etc.), and/or by any other suitable component. For example, the disk storage manager can: initialize a persistent storage instance (e.g., under a client's or user's account, in the platform's storage, etc.), optionally package or otherwise transform the run state (e.g., from the run storage), and store the run state in the persistent storage instance. However, the disk storage manager can be otherwise configured.

The method can also be used with one or more run storage instances (example shown in FIG. 5), which function to coordinate execution across different code blocks and stores run state over long periods of time. Each run storage instance is preferably specific to a single workflow instance (e.g., a "run"), but can alternatively be shared. When a workflow is hierarchical (e.g., includes or references other workflows), each run of the workflow preferably has its own run storage; alternatively, all workflows within the same hierarchy can share a run storage instance. The run storage can be created before the run is initiated, when the run is initiated, be predetermined, or otherwise created. The run storage is preferably stored in persistent storage (e.g., non-volatile memory), but can alternatively be stored in volatile memory, in a distributed system, and/or otherwise stored. The run storage can be manipulated in volatile memory (e.g., RAM), then stored in persistent storage (e.g., upon occurrence of a save event or suspend event), or be otherwise managed. The run storage can be: a stack (e.g., FILO stack, FIFO stack, etc.), a buffer, a memory space (e.g., wherein the run loop or client selects a frame from the stack to execute, based on a frame identifier received by the run loop or stored by the client), an array, a linked list, a heap, and/or be otherwise configured.

The run storage can store the run state for a run. The run state can include a set of block states (e.g., as discussed above). The block states can be ordered (e.g., based on write time, source code block hierarchical position, etc.) or unordered within the run state. The block states can all have a standard symbolic representation (e.g., standard format, standard language such as JSON, etc.), which can enable code blocks written in different languages to be interoperable; alternatively, the block states can have different symbolic representations. The block states can be read (e.g., executed) and/or written to the run storage: according to a set of block read (e.g., execution) and/or write rules, respectively; randomly; and/or otherwise read and/or written to the run storage. The read/write rules can be: FIFO, FILO, LILO, LIFO, and/or any other suitable set of rules.

The method can optionally include one or more response structures, which function to store and/or present responses generated by the run (and/or runlet). The response structure is preferably a buffer, but can alternatively be a queue, array or any other suitable structure. The response structure can be stored with the run, stored in local storage, immediately presented (e.g., on a user interface, written to a patient record, etc.), provided to the interface listening for the external input (e.g., as an argument to "SUSPEND!"), or otherwise stored. A new response structure can be generated for each: run, runlet, partition function invocation, and/or other executable.

The method can optionally include one or more coordination storage instances (e.g., shared storage), which function to store values passed between runs. Each set of runs can include one or more coordination storage instances. In variants the coordination storage can be considered analogous to, and/or be a form of, the run storage, but store run outputs (e.g., run values, such as values output by the run's code blocks; run "states"; etc.) instead of code block outputs. Each coordination storage instance can be accessed by one or more runs or sets thereof. The coordination storage can be: a buffer, heap, queue, stack, array, list of pointers, database entry, a file, and/or any other suitable storage object. The coordination storage may be stored in volatile memory and/or be persisted to durable storage (e.g., file system or disk). The values stored in the coordination storage can optionally include: a source run identifier (e.g., that wrote the value), a recipient run identifier (e.g., that the value is addressed to), a write time, a set of expiration conditions (e.g., expiration time, etc.), and/or any other suitable auxiliary information.

The method can optionally include a set of suspended run trackers, which function to track the runs that have been suspended, and optionally provide run identifiers (e.g., to the coordination operation) for restoration. A run tracker can be: a queue, stack, heap, array, list, and/or any other suitable structure. Examples of run trackers can include: source trackers (e.g., tracking runs that attempted to write to the coordination storage but were suspended because a shared storage condition was violated), sink trackers (e.g., tracking runs that attempted to read from the coordination storage but were suspended because a shared storage condition was violated), and/or any other suitable run tracker.

Figure 5:
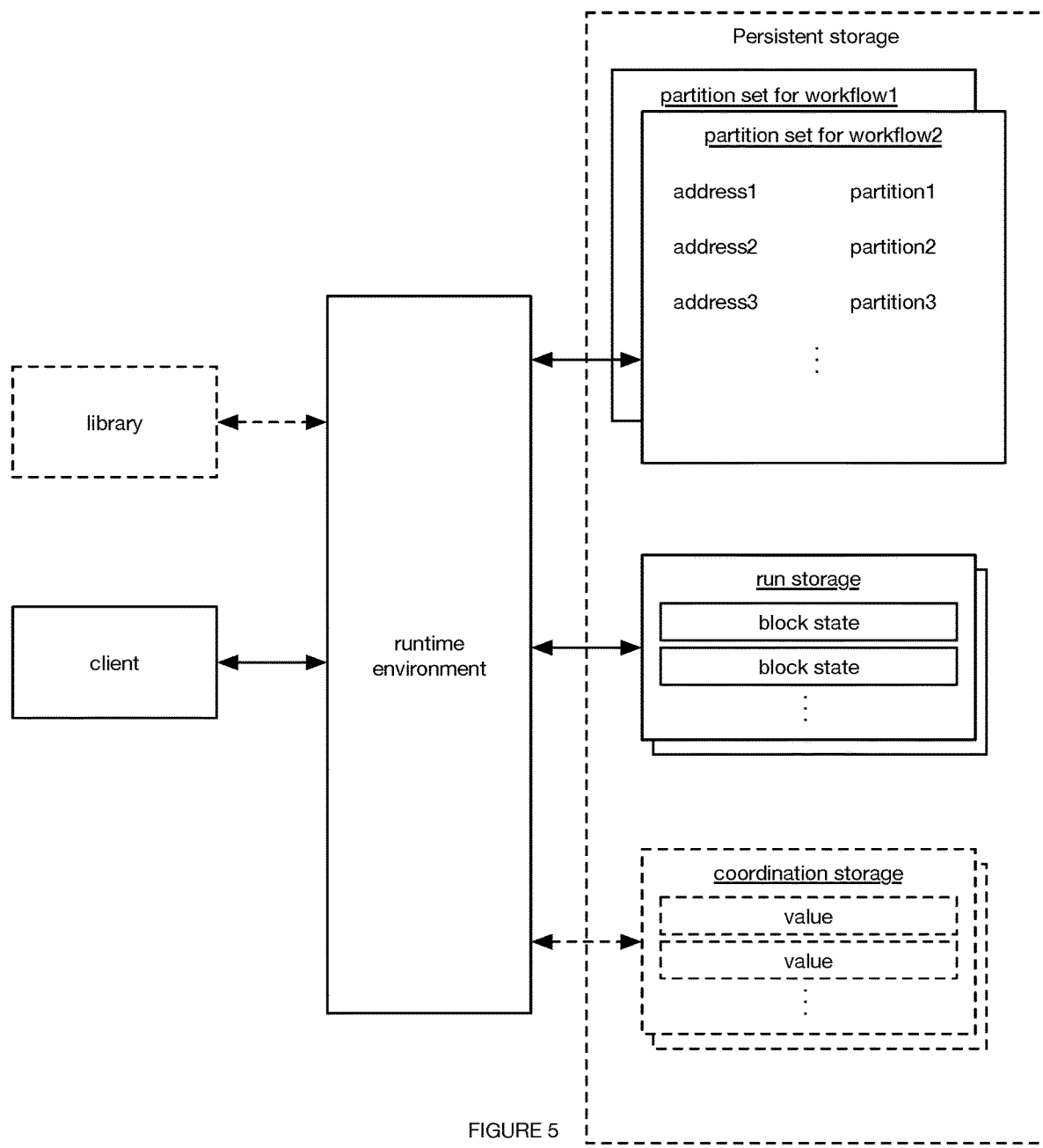
FIG. 5 is a schematic representation of a variant of the system.

The method can be performed using a system including one or more clients, a runtime environment, and persistent storage (example shown in FIG. 5). Components of the system can be specific to or shared between different runs (e.g., for different workflows, different workflow instances, etc.). The system can be localized (e.g., executed at the edge, on-premises, etc.), centralized (e.g., cloud-based, be a remote computing system, be a platform, etc.), and/or otherwise configured.

The client functions to trigger initial run execution, to trigger continuing run execution, to interface with users or external systems, determine (e.g., listen for, receive, calculate, etc.) external inputs of interest (e.g., values for the suspend variables), to orchestrate run execution (e.g., retrieve the run from persistent storage and load the run onto the runtime environment), and/or perform other functionalities. The client can be: an end user device (e.g., mobile phones, personal computers, etc.), an internet-connected measuring device, robot, a third party service, an API, an application (e.g., browser application, web application, native application, etc.), a record management system (e.g., customer relationship management system, electronic medical records system, etc.), and/or any other suitable endpoint.

The runtime environment (e.g., computing environment) functions to execute all or part of the method. In variants, the runtime environment can: pop stack frames from the stack, retrieve the partition identified in the stack frame, execute the partition using the partition values specified by the stack frame (and optionally the result value for the suspend variable), and write stack frames specified by the partition to the stack. The runtime environment can be: a local computing system (e.g., mobile device, laptop, etc.), a remote computing system (e.g., cloud computing system, etc.), a bare metal machine (e.g., processor, thread, etc.), a virtual machine, a container, and/or any other suitable computing system. Each runtime environment can execute one or more runs (e.g., in one or more processes). The runtime environment can be newly initialized each time a run is initialized or continued, and shut down (e.g., torn down) each time a run is suspended, but can alternatively be persisted or otherwise managed. The runtime environment can be controlled by: the platform, the functions (e.g., global functions), the client, and/or by any other suitable component.

The persistent storage functions to store the information for one or more runs (e.g., the stacks for one or more runs). The persistent storage preferably includes nonvolatile memory, but can alternatively include volatile memory. Non-volatile memory can include: disk drives, SSD drives, optical drives, tape drives, F-RAM, flash memory, cloud storage, and/or any other suitable memory. The persistent storage can be controlled by the client, by a user, and/or otherwise controlled. The persistent storage can store information for one or more runs or sets thereof.

Generating the Partition Set for a Workflow

Figure 4:
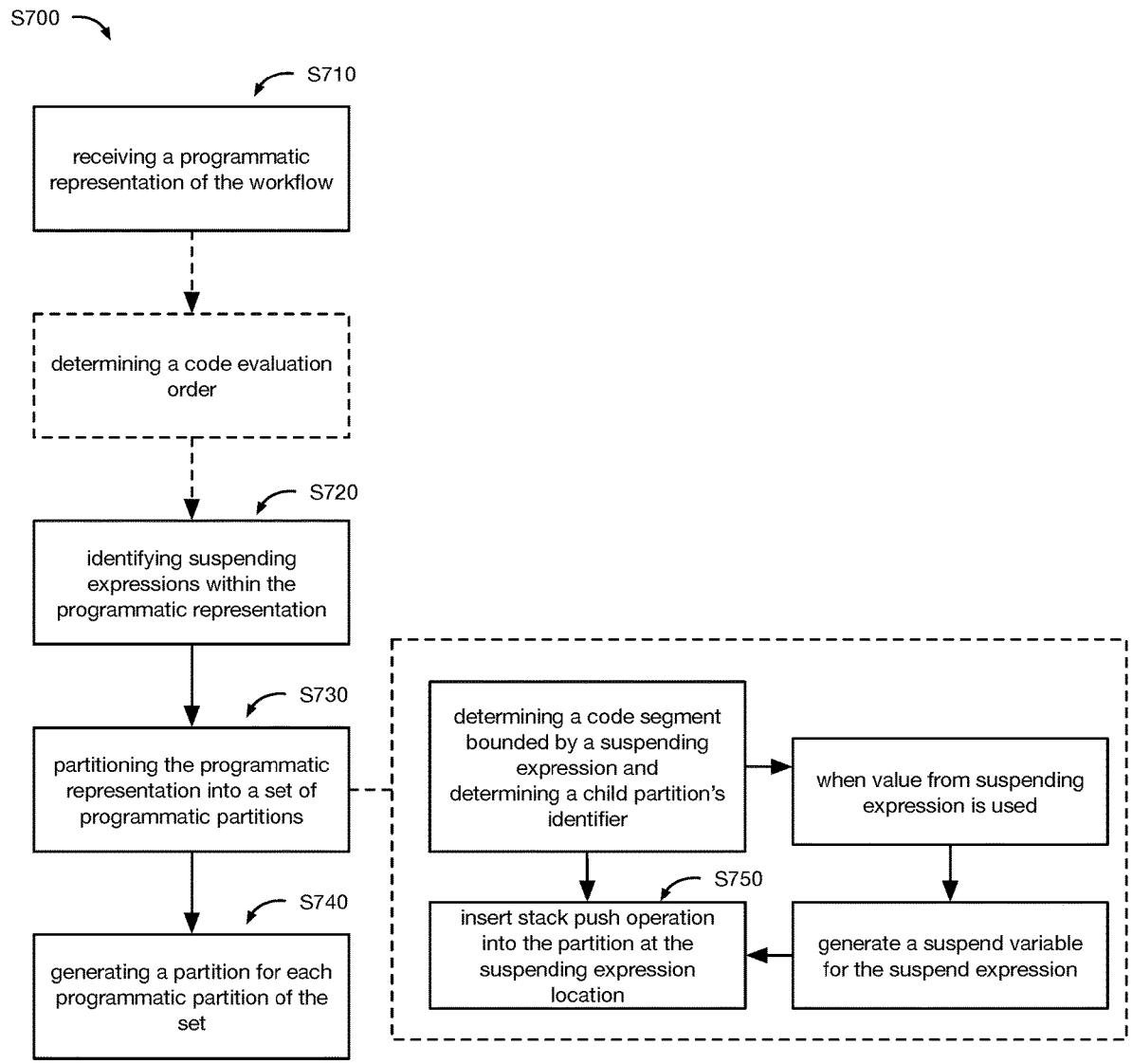
FIG. 4 is a flowchart representation of an example of generating partitions for a workflow.

As shown in FIG. 3 and FIG. 4, variants of the method can optionally include generating a set of partitions for a workflow S700 ("flow"), which can include: receiving a programmatic representation of the workflow S710; identifying suspending expressions within the programmatic representation S720; partitioning the programmatic representation into a set of programmatic partitions S730; optionally inserting a block state storage operation at the suspending expression location S750; and generating a partition for each programmatic partition of the set S740. In variants, this can be used for any form in any language as a preprocessing step, as a set of macros, and/or as an augmentation of a compiler or interpreter or any other suitable modification of an existing programming system and/or language to enable long term workflow programming. However, the programmatic representation of the workflow can be otherwise partitioned into partitions and/or code blocks.

This is preferably performed once for a workflow, but can alternatively be performed each time a workflow instance (e.g., run) is called, or at any other suitable time.

Receiving the programmatic representation of the workflow S710 functions to receive a set of code expressions for division into individual code blocks (e.g., partitions). The programmatic representation is preferably received by the partitioner (e.g., for the programming language, etc.), but can alternatively be received by any other suitable system. The programmatic workflow representation can be evaluated: as a whole (e.g., as a sequence of expressions, in evaluation order, etc.); on a sequence-by-sequence basis; on an expression class-by-expression class basis (e.g., for branching logic, loops, literal expressions, etc.); on an expression-by-expression basis; on an operator-by-operator basis (e.g., wherein the operators are identified by the programming language's compiler); and/or otherwise evaluated. The programmatic workflow representation can be analyzed in: an AST (abstract syntax tree) format, a lexical format, a compiled format, an uncompiled format, and/or in any other suitable format.

Identifying suspending expressions within the programmatic representation S720 functions to determine where the partitions should be split. Suspending expressions can be as described above, code expressions as discussed above, or be any other suitable expression. The suspending expressions can be determined before compilation, during compilation, after compilation, before execution, during execution, and/or at any other suitable time. The suspending expressions can be identified by the partitioner and/or component thereof, the compiler (e.g., for the language), manually, and/or by any other suitable component. The suspending expressions can be: a predetermined set of expressions (e.g., conditional statements, "suspend!" expressions, function calls, workflow calls, coordination function calls, exceptions, the end of a function, etc.), asynchronous expressions (e.g., requiring the output of another code block, requiring a variable bound after the expression's location in the code block, determined based on the expression's execution context, a call that requires evaluation, etc.), and/or any other suitable expression. The suspending expressions can be: manually defined, defined by the programming language, determined using the programmatic representation's AST, determined using compiler logic, and/or be otherwise determined.

In a first variation, suspending expressions are identified by: passing an expression from the set to a partitioning system (e.g., partitioner), wherein the partitioning system recursively analyzes each expression and its subexpressions. An expression is classified as a suspending expression if it or any of its subexpressions are found to be suspending expressions or suspending operations.

In a second variation, suspending expressions (SEs) are identified by: passing a set of expressions (e.g., from the programmatic representation) to an SE module, wherein the SE module classifies the set of expressions as including and/or excluding a suspending expression, and/or determines which partitioner to use for a given expression. The set of expressions is preferably a sequence of expressions, but can alternatively be a single expression (e.g., a single variable or operator from the code). The SE module can be hardcoded to identify suspending expressions (e.g., as a set or series of keywords), trained to identify suspending expressions (e.g., be a machine learning model, such as a neural network), and/or otherwise configured. In a specific example, the SE module receives: an expression; the address of the expression; the address of the current partition; and partition variables (e.g., parameters) defined up to this point (e.g., without values), and returns: a partition set (e.g., map of addresses to function definitions or code blocks) and optionally a function wrapper (e.g., such that the partition set can be executed independently from the rest of the workflow code), such as a "start" expression.

In a third variation, SEs are identified by: converting the workflow code into an AST, and traversing the AST to identify SEs. In a second variation, SEs are determined by searching the workflow code for SE keywords and/or relationships. However, suspending expressions can be otherwise identified.

In a fourth variation, SEs are determined by the compiler as asynchronous operations (e.g., defined according to the programmatic representation's programming language).

However, SEs can be otherwise identified.

The method can optionally include determining an evaluation order for the workflow code's expressions or executable statements (example shown in FIG. 4). This can be done as part of SE identification, programmatic representation partitioning, performed separately, and/or otherwise performed. The evaluation order can be determined from the AST, by interrogating the code, by using the programming language's compiler, using the programming language's execution logic, or otherwise determined.

Partitioning the programmatic workflow representation into a set of programmatic partitions S730 functions to generate the basis for code blocks (e.g., partitions). The programmatic representation is preferably partitioned at the suspending expressions' location in the code evaluation order, but can be otherwise partitioned. The programmatic representation can be partitioned by the partitioner (and/or component thereof), the compiler (e.g., for the programming language), manually, and/or otherwise partitioned. The programmatic representation is preferably partitioned before execution, but can alternatively be partitioned during and/or after execution. The programmatic representation can be partitioned before compilation, during compilation, and/or after compilation.

Partitioning the programmatic representation can include: partitioning the code based on the SE locations and assigning identifiers (e.g., persistent identifiers to each partition). Partitioning the programmatic representation can optionally include inserting stack push operations (e.g., state push operations) based on the SE locations S750; alternatively, S750 can be performed by the runtime environment. However, the programmatic representation can be otherwise partitioned.

In a first variant (example shown in FIG. 6), partitioning the programmatic representation includes: determining a code partition bounded by at least one suspending expression (e.g., up to the next suspending expression); determining an identifier for the next partition (e.g., child address for the child partition, in code evaluation order); and inserting a stack push operation into the partition at the suspending expression location (e.g., within the code). The stack push operation can include the next partition's address, partition variables (e.g., all partition variables defined up to the suspending expression's/stack push operation's location, only the partition variables needed to execute the next partition, etc.), partition values (e.g., defined within the lexical context containing the suspending expression; a map of partition variables bound to partition values; partition values defined up to the suspending expression's location in the code execution, etc.), and optionally a suspend variable (e.g., when the value returned by the suspending expression is used in the following partition). This variant can optionally include evaluating whether the suspending expression is associated with a suspending event (e.g., is a "SUSPEND!" operator or other operator that can output a suspend signal and/or requires external input). This variant can optionally include evaluating whether the suspending expression's result is used in subsequent partitions, and automatically generate a suspend variable (e.g., initialize the variable, but unbound to a value), wherein the suspend variable is included in the stack frame that the partition pushes to the stack.

Figure 9A:
FIG. 9A is a schematic representation of an example of generating a partition for nested non-suspending expressions.
Figure 9B:
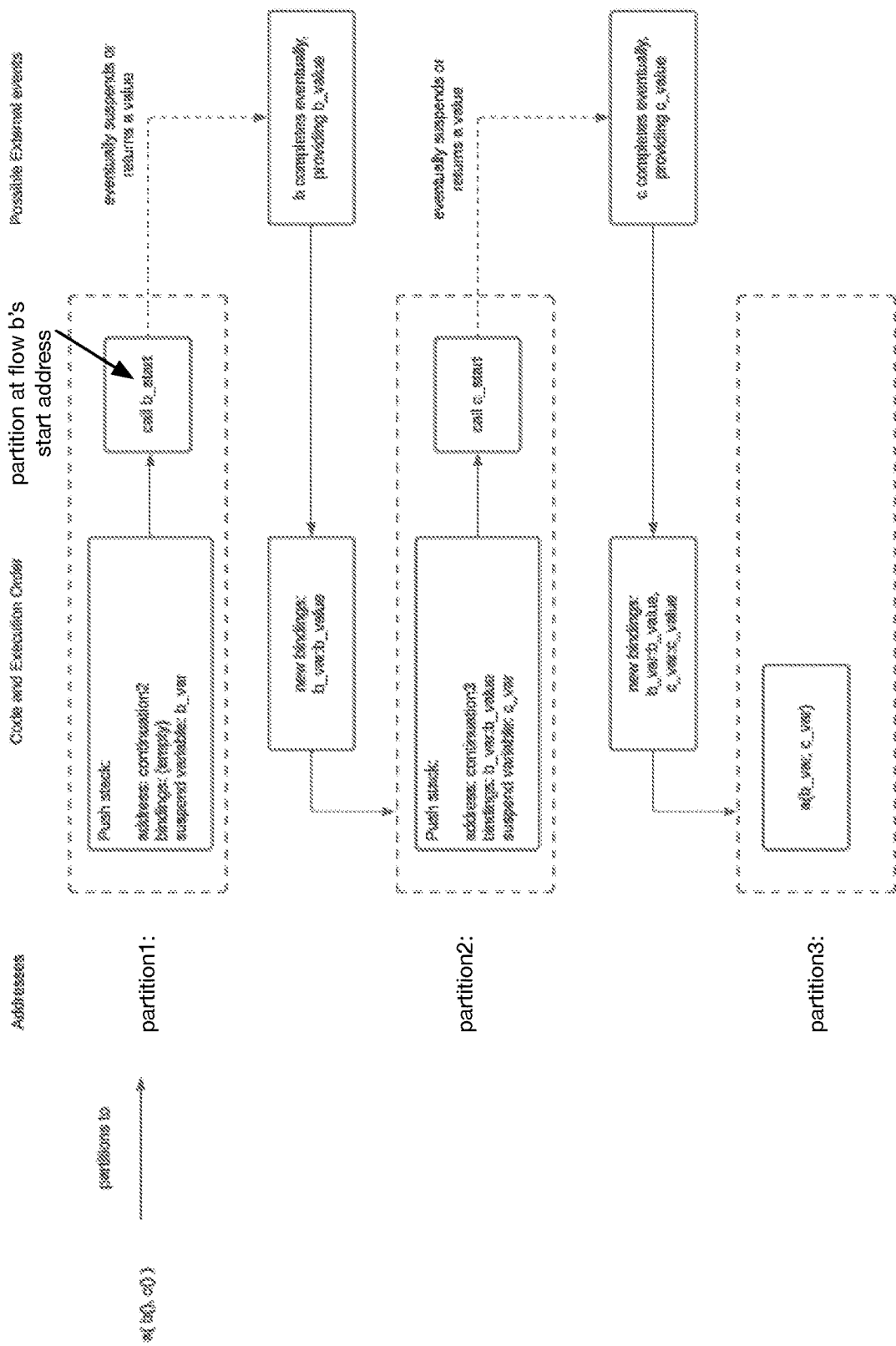
FIG. 9B is a schematic representation of an example of generating partitions for nested suspending expressions.
Figure 10:
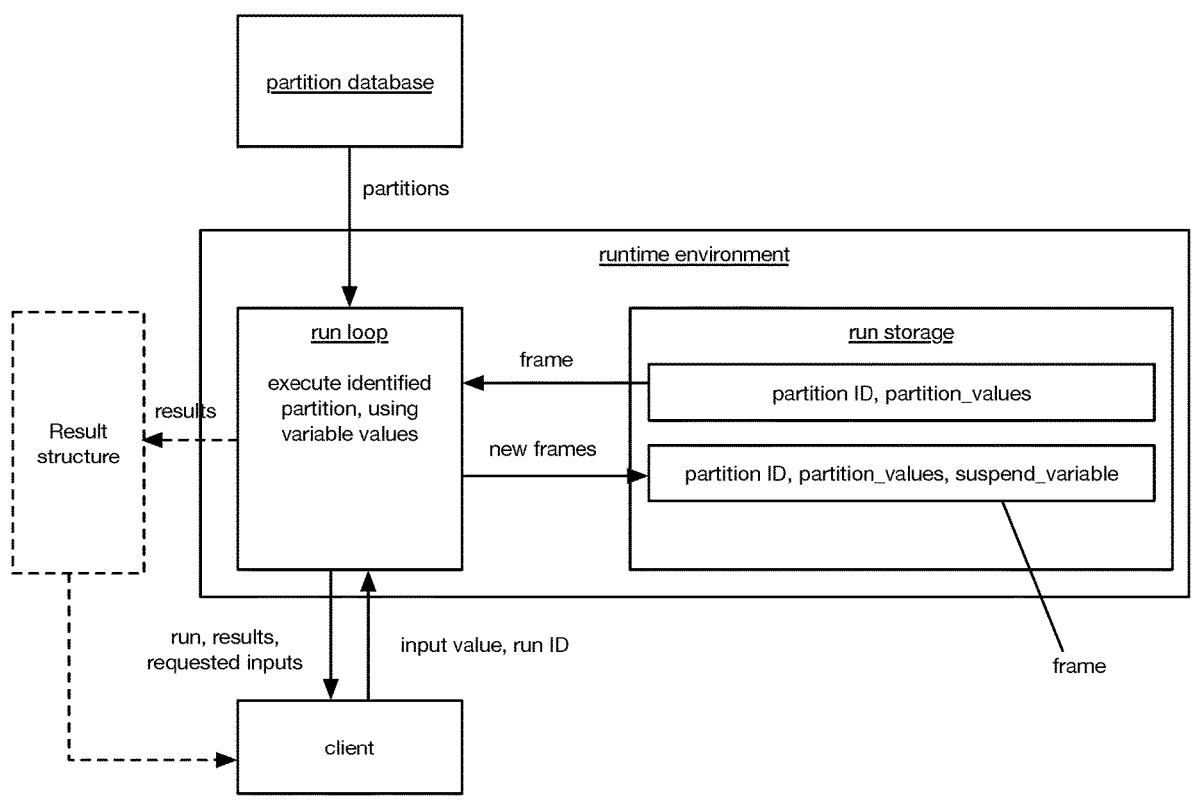
FIG. 10 is a schematic representation of an example of workflow execution.

In a second variant (examples shown in FIG. 8A-C and FIG. 9A-B), the programmatic representation includes the results of flow invocations being used by a top level function. In a first example, function a can be executed based on the outputs of functions b and c. In this example, the partitioner does not modify the code. In a second example, function a can be executed based on the outputs of workflows b and c. In this variant, partitioning the programmatic representation includes: automatically creating an suspend variable for each flow invocation (e.g., subflow invocation) within the code, creating a partition (partition) at each flow invocation (e.g., subflow invocation), inserting a stack frame push operation including the (unbound) respective suspend variable into the parent partition (e.g., before the flow invocation), and replacing the flow invocations (e.g., subflow invocations) with a call to the initial partition (e.g., first address) of the respective flow within the partition representing the parent function (example shown in FIG. 9B). However, functions can be otherwise partitioned.

In a third variant, the programmatic representation includes one or more loops (e.g., for, while, recursion, etc.). In this variant, the partitioner can check for the presence of a suspending expression within the loop. If no suspending expression is present, then the loop is compiled using the looping constructs of the underlying language. If a suspending expression is present, a partition (partition) is created starting at the beginning of the loop and the remainder of the loop is partitioned as discussed in the first variant (or otherwise partitioned), wherein the loop-beginning partition identifier (LBPI) (e.g., address) can be made available to the partitioner. In a first variant, it is made available as a dynamic variable or in a second variant, it is made available as an additional argument to the partitioner. The partitioner can use the LBPI to identify (e.g., redirect execution during runtime) to the partition containing the beginning of the loop from a later partition (LP) appearing later in the loop body. In one variant, this is achieved by directly invoking the partition LBPI at the end of the LP. In another variant, this is achieved by pushing a stack frame containing the LBPI at the end of the LP.

In a fourth variant (examples shown in FIG. 8A-C), the programmatic representation includes branching logic (e.g., if/then/else). In this variant, the partitioner can check for the presence of a suspending expression within the expression set (e.g., series of expressions). If no suspending expression is present, then the expression set is compiled using the branching logic constructs of the underlying language. If a suspending expression is present, a suspend variable for the suspending expression can be created, the rest of the logic can be partitioned as discussed in the first variant (or otherwise partitioned), and the suspending expression can be replaced with the suspend variable in the partition evaluating the suspending expression. However, branching logic can be otherwise partitioned.

In a fifth variant, partitioning the programmatic partition can include: splitting each asynchronous operation in each function into different secondary partitions, and bundling the synchronous operations within the function into an initial partition. Each asynchronous operation within the initial partition can be replaced with a state push operation (e.g., stack push operation), identifying the secondary partition for the respective (e.g., replaced) asynchronous operation, at least the variables to be used or passed to the secondary partition/asynchronous operation, and at least the values to be used or passed to the secondary partition/asynchronous operation. In this variant, execution-suspending expressions (e.g., execution-halting expressions) can optionally be identified, and optionally replaced with a "suspend!" command that halts run execution.

Generating a code block for each programmatic partition of the set S740 functions to wrap the programmatic partitions into individually-executable code blocks. This can include: determining an identifier for each programmatic partition, wrapping the programmatic partitions (e.g., by adding a "start" expression at the end of each partition), compiling the programmatic partitions, determining the partition variables defined up through the end of the programmatic partition, determining any suspend variables, and/or otherwise generating the code block. The generated code block is preferably persistently stored (e.g., in a code base, in a workflow library, etc.), but can alternatively be transiently stored (e.g., during execution, during compilation, etc.), and/or otherwise stored. The generated code block is preferably identified by a persistent identifier, but can be identified by a transient identifier, by the workflow parameters (e.g., name, version, etc.), by the partitioning time, or be otherwise identified. The identifier can be randomly determined, determined based on the partition's location within the programmatic workflow, determined based on the partition's code (e.g., be a hash of the code), and/or be otherwise determined.

However, the code block set for a workflow can be otherwise determined.

In a first example (example shown in FIG. 12), generating the partition set for the workflow can include: converting the programmatic workflow representation to an AST, obtaining the main sequence from the AST, partitioning the main sequence into individual partitioned sequences (e.g., expressions, subexpressions, subsequences, etc.; subcomponents of the main sequence; etc.), and further partitioning individual partitioned sequences of the main sequence with the sequence partitioner. This can be performed by the compiler (e.g., native compiler for the language, custom compiler, etc.), by a set of partitioners, or otherwise performed.

In this example, expressions can be added to a partition until a suspending expression is encountered, wherein the suspending expression (and/or associated sequence of expressions) can be partitioned and compiled in a nonstandard manner. Code sequences that do not include suspending expressions can be compiled using the programming language's standard or native compiler.

In a second example (example shown in FIG. 13), partitioning individual partitioned sequences of the main sequence with the sequence partitioner can include: receiving an input sequence; determining the next expression within the input sequence; determining an expression class for the expression (e.g., branching logic, loop, literal, function call, flow call, etc.); optionally determining the sequence of expressions within the partitioned sequence associated with the expression class; and partitioning the expression (or associated sequence of expressions) using an expression-class-specific partitioner. Partitioning individual partitioned sequences of the main sequence can also include: receiving an output from the expression-class-specific partitioner including a start expression identifier for the analyzed expression (e.g., wherein the start expression can be inserted before a suspending expression to initiate suspending expression computation), a partition set for the analyzed expression (e.g., wherein the partition set can include multiple partitions when the evaluated expression includes multiple child expressions), and whether the analyzed expression includes a suspending expression; appending the analyzed expression to the current sequence when the analyzed expression does not include a suspending expression; and, when the analyzed expression includes a suspending expression: appending a stack push operation to the current sequence, appending the start expression identifier to the current sequence, adding the partition set for the analyzed expression to the partition set. This can be repeated until no expressions remain in the input sequence, at which point a start sequence (e.g., the initial expressions that need to be executed to initiate computation of the entire sequence), the partition set, and a suspending expression presence indicator can be returned when the input sequence includes a suspending expression; and the input sequence, a partition set, and a suspending expression exclusion indicator can be returned when the input sequence does not include a suspending expression.

In a third example (example shown in FIG. 14), each child expression within a code block is analyzed (e.g., serially) to determine if it is a suspending expression. When it is not, the child expression is added to the current partition if it is not, and the next child expression is analyzed. When it is, the child expression's start expression is added to the current partition; the AST is analyzed to determine whether there are descendant expressions of the child expression; a stack push operation is added before the child expression's start expression; a new partition can optionally be generated for the child expression; and the analysis process is repeated for the next child expression (e.g., wherein the next child expression can be added to the current partition if the next child expression does not include a suspending expression). Adding a stack push operation can include: determining whether the value of the child expression is explicitly bound (e.g., to a predefined variable, defined by the code in the current partition, etc.); autogenerating a variable name when it is not explicitly bound; recording the variable name (of the auto-generated variable name or the explicitly-bound child expression) as the suspend variable in the stack frame; generating the next partition variable list by appending the suspend variable to the existing partition variable list; and adding an identifier for the next partition to the stack frame push operation.

However, the programmatic workflow representation can be otherwise partitioned.

Executing a Workflow

The method for long-term programmatic workflow management can include executing a run (e.g., an instance of a workflow). Executing a run can include: initializing a run; iteratively: identifying a next code block S100, and executing the identified code block using passed variable values S200; suspending the run when a suspend event is encountered S300, persistently storing the run state S400, and resuming the run S500. However, the long-term programmatic workflow can be otherwise executed.

Different instances of the method can be performed for different workflows, different users or entities (e.g., different entities, different applications, different customers, different patients, etc.), different runs, and/or otherwise performed. Different instances of the method can be concurrently, serially, and/or otherwise performed. Run execution is preferably controlled by the run loop (and/or instance thereof), but can be otherwise controlled.

Different runs can be executed in the same or different computing environments (e.g., runtime environments). Different execution instances of the same run (e.g., separated by run suspension and/or shutdown) are preferably executed in different computing environments (e.g., different container, different virtual machine, etc.), but can be executed in the same computing environment (e.g., the same bare metal machine). The volatile memory is preferably cleared between execution instances, but can alternatively be retained (e.g., by keeping the computing environment running).

The run states for different runs can be stored in the same or different persistent storage (e.g., platform storage in association with a client or user account; in client- or user-specified storage, such as the user's cloud storage account; etc.), but can alternatively be stored in temporary storage, be unstored, or be otherwise stored. The run states for runs within the same run set (e.g., runs interacting with each other) are preferably executed in the same computing environments and stored in the same run state storage, but can be executed and/or stored in different computing environments and/or state storage.

Figure 11:
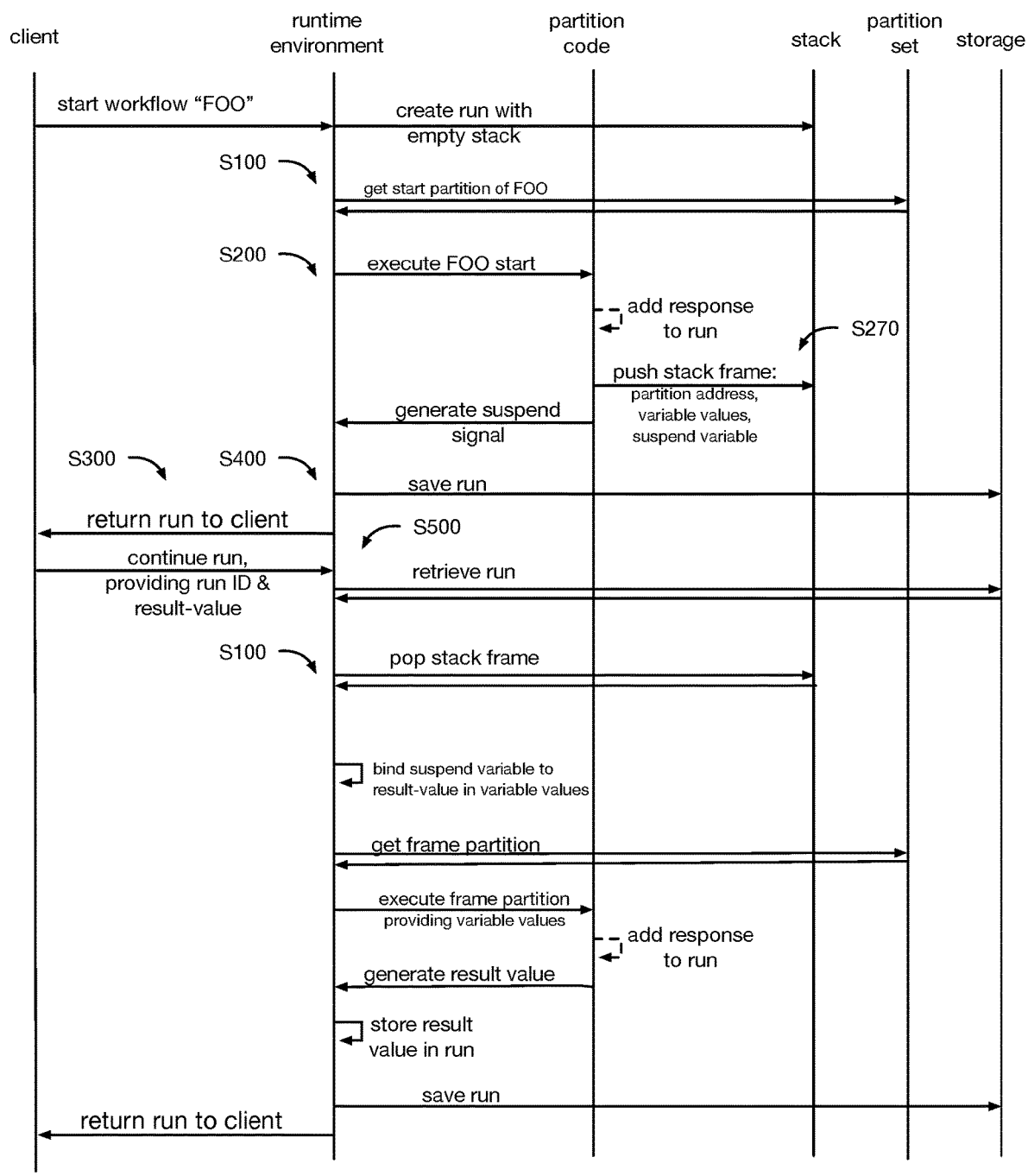
FIG. 11 is a schematic representation of an illustrative example of workflow execution.
Figure 12:
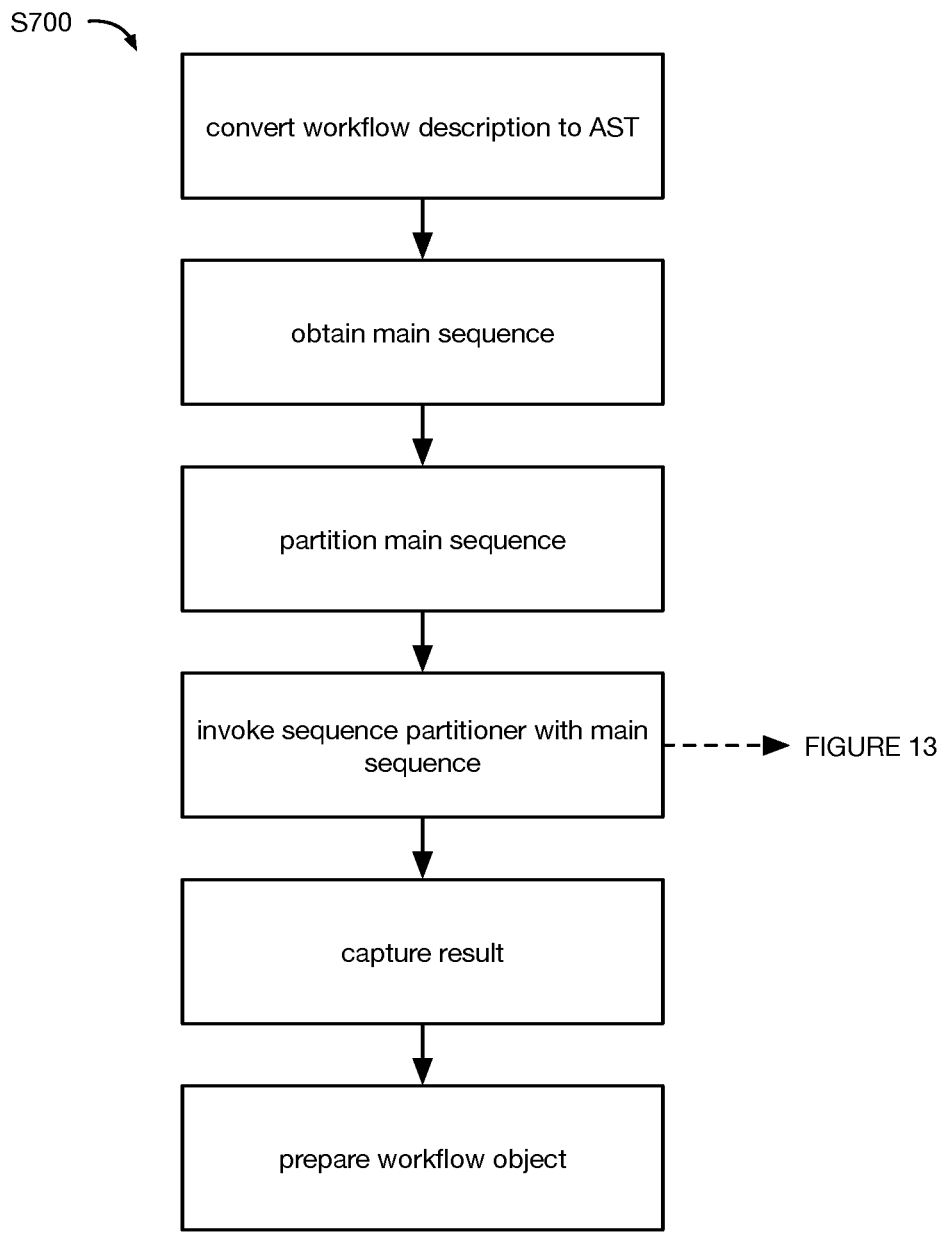
FIG. 12 is a schematic representation of a specific example of partition generation (e.g., by a compiler).
Figure 13:
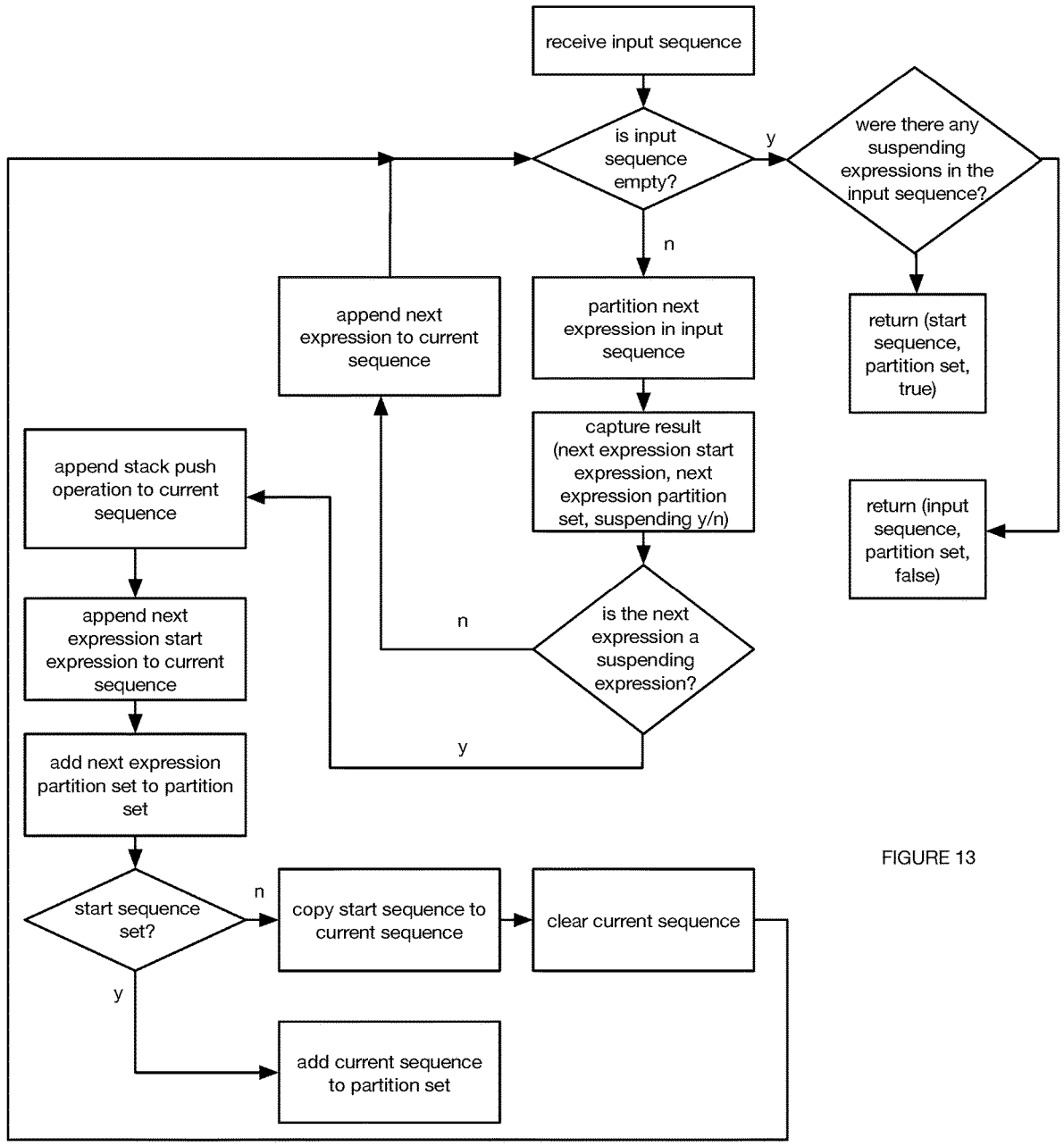
FIG. 13 is a schematic representation of a specific example of sequence evaluation during partition generation.
Figure 14:
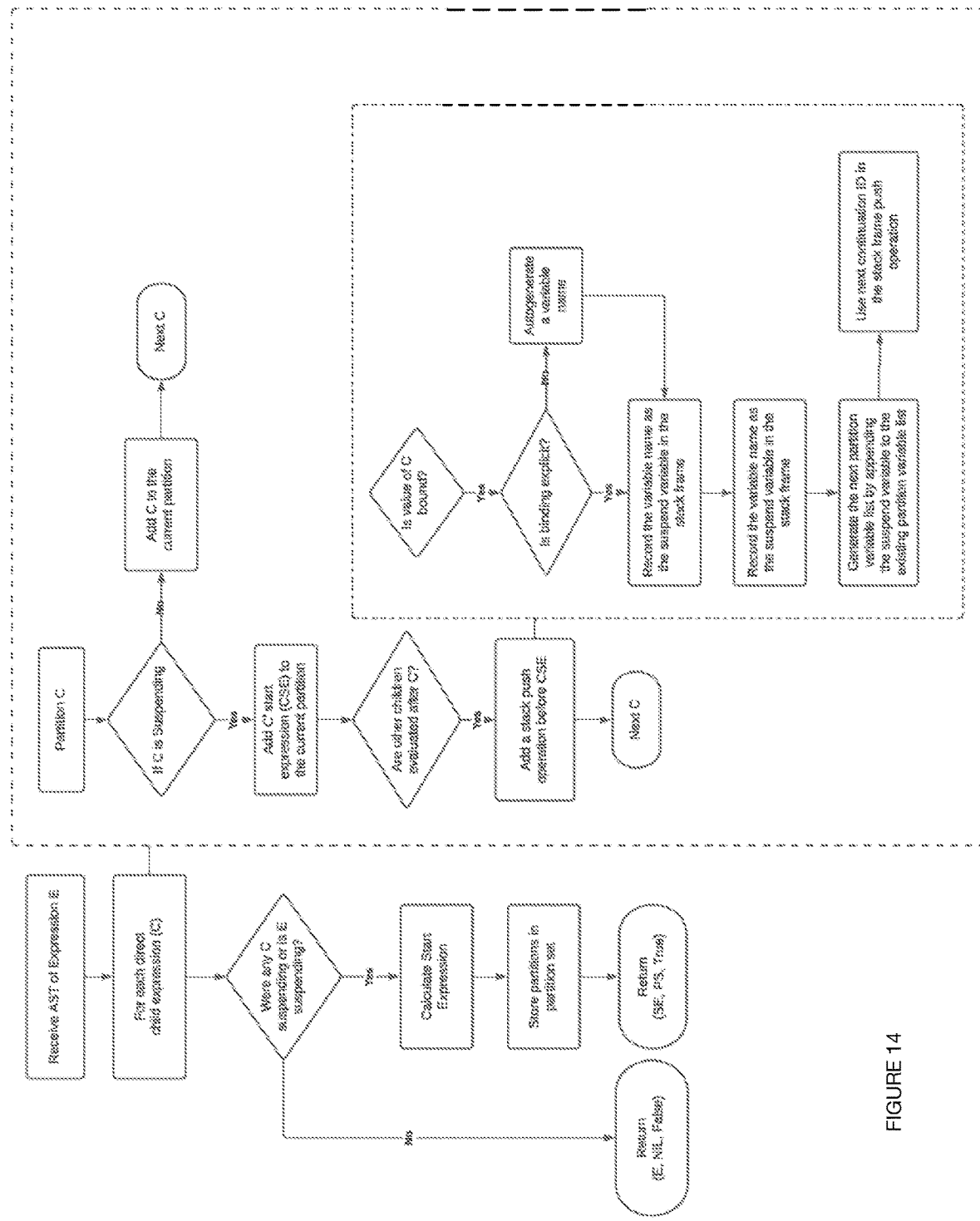
FIG. 14 is a schematic representation of a specific example of generalized partition generation.

Initializing a run functions to initialize execution of a workflow instance, examples shown in FIG. 1, FIG. 2, and FIG. 11. The run is preferably initialized responsive to receipt of an initialization request received from a requesting system, but can alternatively be initialized responsive to occurrence of a trigger event (e.g., timer expiration, data satisfying a predetermined condition, etc.), or initialized at any other suitable time.

The requesting system can be: a user, a client (e.g., web application, native application, desktop program, etc.), another run, a coordinating operation, and/or any other suitable system. The request can be received via an API call, a function call, a library call, and/or otherwise received.

The initialization request can include a run configuration, a requesting system identifier (e.g., address, URI, etc.), and/or other information. The run configuration can include: run parameters, initial variable values, and/or other information. The run parameters can include: a workflow identifier (e.g., identifying the code block set to execute), a set of data source identifiers (e.g., for the run to read data from, such as a training database), a set of data sink identifiers (e.g., for the run to write data to, such as an artifact database, etc.), computing environment parameters (e.g., identifier; configuration, such as machine provider, orchestrator, container type, image location, etc.; access credentials; etc.), persistent storage parameters (e.g., where the run states should be persisted; access credentials therefor; etc.), and/or values for any other suitable set of parameters. Initiating a workflow can include: optionally provisioning a computing environment according to the computing environment parameters, determining an identifier for the run, initializing run storage for the run (e.g., initializing a run storage object associated with the run identifier), and retrieving the code block set, index thereof, and/or the initial code block for the identified workflow. However, the workflow can be otherwise initialized.

Identifying a next code block S100 functions to identify which pieces of code should be executed next. The next code block is preferably identified by the run loop (e.g., from a next block state), but can alternatively be identified by the requesting system (e.g., wherein the next code block identifier was returned to the requesting system), by the run state (e.g., the run storage object), by another code block (e.g., a preceding code block), by another run, by a coordinating operation, and/or by any other suitable system. The next code block is preferably identified after execution of the prior code block is complete, but can alternatively be contemporaneously identified during execution, identified before prior code block execution, identified upon receipt of an execution request (e.g., initialization request, continuation request, etc.), and/or identified at any suitable time. The next code block is preferably identified by the persistent identifier associated with the code block (e.g., a distinguished address associated with a workflow or partitions set), but can additionally or alternatively be identified by: a position within a partition graph (e.g., be the root partition, be the next partition following a prior partition), and/or otherwise identified.

In a first variation, identifying the next code block includes identifying the first code block within a workflow. This variant can be useful when the run state storage is empty and/or when the run is newly initialized.

In a second variation, identifying the next code block includes: selecting a next block state from the run storage object and determining the identifier for the next code block from the next block state (e.g., wherein the next block state includes an identifier for the next code block). This variant can be useful after the run has been initialized. The next block state can be selected based on block state selection logic, randomly selected, or otherwise selected. The block state selection logic can be defined by the run state's type (e.g., stack, buffer, heap, etc.), by the workflow, by a user, by the code block's original programming language, by the prior code block (e.g., wherein the logic under which a given block state can be selected is specified by said block state, etc.), by the run loop, and/or otherwise defined. Examples of block state selection logic can include selecting: the oldest state, the newest state, the state satisfying a set of conditions (e.g., a state with an execution time substantially equivalent to a current time, a state associated with the just-executed code block identifier, etc.), and/or any other suitable logic.

In a third variation, identifying the next code block can include determining the identifier for the next code block from a request (e.g., initialization request, continuation request, etc.) received from the requesting system.

However, the next code block can be otherwise identified.

Executing the identified code block S200 functions to execute an instance of the code block specific to the run, to continue run execution. The identified code block is preferably executed using passed variable values (e.g., passed in the block state used to identify the code block), but can additionally or alternatively be executed using default values, global values, and/or any other suitable value. The passed variable values can be provided by: the requesting system (e.g., a client; another run; etc.; e.g., at run initialization, at run continuation, at run partition, etc.), another code block (e.g., via the block state output by the other code block), the block state calling the code block (e.g., wherein the variable values are stored in the respective block state), a global variable value repository, shared storage (e.g., shared between runs), or otherwise provided. The passed variable values can include: the values bound to the partition variables (e.g., the variables defined through the end of the prior partition or partition), result values for suspend variables (e.g., input values), and/or other variable values.

Executing the identified code block S200 can include: retrieving the identified code block S210, optionally compiling the retrieved code block, executing the code within the code block using the provided values, optionally updating the run state S270, and generating a code block output S290. However, the identified code block can be otherwise executed.

Retrieving the identified code block S210 functions to retrieve a specific block of executable code (e.g., partition). The code block is preferably retrieved from a code block database (e.g., global database, database for the workflow, etc.) but can be retrieved from any other suitable storage, including but not limited to files on disk containing source code, object code or compiled binary code.

Executing the identified code block S200 can optionally include compiling the retrieved code block. In a first variant, the code block is stored in compiled format (e.g., the code is compiled once during partitioning), so no compilation is needed during execution. In a second variant, the code block is stored in an uncompiled format, and is compiled ad hoc during execution (e.g., each code block is compiled just-in-time or after retrieval for execution). In a third variant, the entire code block set (and/or subsets thereof) is compiled each time the run is executed. However, the retrieved code block can be otherwise compiled.

Executing the code within the code block using the provided values functions to execute the workflow code. The code within the code block is preferably executed according to execution logic for the code block's original programming language, but can be otherwise executed.

Executing the identified code block S200 can optionally include updating the run state S270. The run state is preferably updated by storing (e.g., pushing) block states to run storage, but can alternatively include pushing a new run state to run storage (e.g., overwriting, appending, or otherwise updating the run storage), and/or otherwise updating the run state. Writing block states to run storage can enable the run state (e.g., collection of block states) to be incrementally built and/or tracked by execution of successive code blocks (examples shown in FIG. 5, FIGS. 8A-C, FIG. 10, and FIG. 11). The block states are preferably stored to run storage by the code block, but can alternatively be otherwise stored by the code block, be stored by the run loop, and/or by any other suitable component. Storing the block state to run storage can include: writing the block state (e.g., frame) to run storage (e.g., a run stack), introspecting a block execution state and writing the block execution state to run storage, or otherwise storing the block state. The block state can be written to run storage: natively (e.g., when an asynchronous operation is encountered), using an explicit code statement (e.g., a stack push operation, using a special exception, etc.), and/or otherwise written to run storage.

Block states can be stored (e.g., written, pushed, etc.) to run storage at any point in the code block (e.g., at any point during code block execution, throughout code block execution, etc.), as the penultimate operation in the code block, at the beginning, end, and/or at a predefined location within the code block, and/or performed at any other suitable point in the code block.

The stored block state is preferably configured as discussed above, but can alternatively be a run state tracking mechanism native to the programming language (e.g., a Java stack, a Python stack, etc.), and/or be otherwise configured. The identifier for the next code block within the written block state can be hardcoded in the block state push operation (e.g., predetermined) or dynamically determined. Examples of the next code block identifier can include: a persistent identifier for the next code block (e.g., in the execution order, of the asynchronous operation that the push operation replaced, etc.), the asynchronous operation's address, an exception's address, and/or be any other suitable identifier. In variants, the stored block state does not include compiled code (e.g., does not include the compiled code block, does not include the compiled code block set). This variant can enable faster run state restoration, since less data needs to be restored to disk. Alternatively, the stored block state can include compiled code (e.g., similar to a lisp image).

In one variation, storing the block state includes writing a frame including partition variable values and an identifier for the next partition to a run stack. The next partition's is preferably predefined (e.g., when the partition was generated), but can alternatively be dynamically determined. For example, dynamically determining the next partition can include determining the next partition's identifier, such as by looking up the next partition's identifier in a partition graph or look up table, optionally based on values available at runtime (e.g., the current partition identifier and/or current variable values), or otherwise determined. The passed variable values are preferably different from those initially received by the partition (e.g., updated based on partition execution), but can alternatively be the same.

However, the block states can be otherwise stored.

Executing the identified code block S200 can include generating a code block output S290, which can be used to control subsequent run execution. For example, the code block output can provide variable values to subsequent code blocks, indicate that the next code block should be identified and executed, indicate that the entire run should be suspended, and/or provide any other suitable functionality. Additionally or alternatively, the code block outputs can be: presented to a user, provided to a third party, stored in the response structure (e.g., with one or more presentation conditions, such as timers, triggering events, etc.), and/or otherwise used. The code block output is preferably generated after code block execution completion, but can alternatively be generated during code block execution, and/or at any other suitable time. Outputting the code block output can include: returning the code block output, writing the code block output to a storage object, generating a code block output, and/or otherwise outputting a code block output The output can be: a suspend signal (e.g., suspend command), a result value, and/or another output.

The result value can include: a null value (e.g., nothing is returned), a variable value, and/or any other suitable value. When variable values are returned, they can be subsequently bound to an input variable of another code block (e.g., identified within a block state stored in the run storage), be returned to the requesting system, be written to shared storage, and/or be otherwise managed. For example, the result value can be bound to the suspend variable of the stack frame that identifies a child partition (e.g., by the runtime environment; example shown in FIGS. 8A-C), be used in a parent partition, or be otherwise used.

A suspend command can include (or be, or be treated as) a suspend signal by the managing system (e.g., the run loop), which then suspends the entire run (e.g., does not identify the next code block until a continuation condition is met). The suspend command can be explicitly coded into the workflow's programmatic representation (e.g., in an expression, in a "catch" block, be a specific exception type, etc.), and/or otherwise determined.

The suspend command can optionally be associated with a set of default continuation parameters, which specify the default continuation conditions under which the run should be automatically continued, the default value that should be used (e.g., bound to the suspension variable), continuation validation information, and/or any other suitable information. The default continuation parameters can be: global defaults (e.g., for all workflows, for the workflow, etc.), be specified by the code block (e.g., hardcoded into the code of the code block), and/or otherwise specified. The default continuation conditions can include: satisfaction of an expiration time (e.g. current wall clock time substantially matches the expiration time), satisfaction of an expiration duration (e.g., a predetermined time period has passed), a default restart time, workflow execution conditions (e.g., a run of a predetermined workflow being called), an external event being satisfied (e.g., an external process generating a value, a sensor measurement satisfying a predetermined value or range, etc.), and/or any other suitable set of conditions. The default continuation parameter values can be recorded in an ordered database index and associated with an identifier of the suspended run, but can be otherwise stored.

However, the identified code block can be otherwise executed.

However, the code block can be otherwise executed.

Iteratively repeating S100-S200 functions to continue run execution (e.g., successive workflow code block execution). S100-S200 can be iteratively repeated for successive code blocks until a suspend event is encountered (e.g., while a suspend event is not encountered; examples shown in FIG. 1, FIG. 2, FIG. 10, and FIG. 11), and/or until another stop event is encountered. Repeating S100-S200 for the next code block is preferably controlled by the run loop, but can alternatively be controlled by a prior code block, by the compiler, and/or at any other suitable time. S100-S200 is preferably repeated as long as no suspend event is encountered, but can alternatively be repeated when any other suitable set of iteration conditions are met (e.g., when a predetermined number of code blocks must be executed before suspension, etc.). In one example, repeating S100-S200 can include iteratively: popping the top frame from the run stack, optionally binding any result values from a prior partition to a suspend variable (e.g., if a suspend variable is present in the top frame), identifying the next partition from the top frame, and executing the partition identified in the top frame using the frame's variable values and optionally the result values. In another example, repeating S100-S200 can include: determining a next asynchronous block's identifier (e.g., temporary or permanent address) from an event queue, and executing the next asynchronous block. However, S100-S200 can be otherwise repeated.

A suspend event can include: detecting a "suspend" signal (e.g., output by a code block, returned by a coordination operation, etc.), encountering a predetermined operator (e.g., "SUSPEND!", an operator requiring external input, an operator that generates a suspend signal, etc.), determination that at least one variable required by the next code block lacks a bound value (e.g., is unbound; the next code block requires a value for a currently-unbound variable; etc.), determining that the run storage is empty (e.g., no next code blocks are identified), and/or otherwise defined (e.g., include any other suitable set of suspension conditions). The set of suspension conditions can be defined by the run loop, by the code block outputting the suspend event, and/or otherwise defined. The suspend event can be detected by: the run loop, a code block, the requesting system, and/or by any other suitable system.

Suspending the run S300 functions to pause the run to await an external result value. The run is preferably suspended by the run loop, but can alternatively be suspended by a prior code block, the compiler, and/or by any other suitable system. The run is preferably suspended when the suspend event is encountered, but can additionally or alternatively be suspended responsive to receipt of a suspension request (e.g., from a requesting system), and/or at any other suitable time.

Suspending the run can include: halting further code block execution (e.g., not repeating S100), storing the run state (e.g., by persisting the run to non-volatile storage), optionally shutting down the computing environment, optionally returning run information to an external system (e.g., the suspend variable, the run identifier, validation requirements, etc.), optionally returning the suspension context (e.g., to an expiration manager), and/or executing other processes.

Shutting down the computing environment (e.g., the runtime environment, the process, etc.) functions to release the run's computing resources, such that other runs or applications can utilize said computing resources. Shutting down the computing environment can include: erasing the data in the volatile memory for the run, depowering the computing system, tearing down the containers or virtual machines that the run was executing in, and/or otherwise shutting down the computing environment. The computing environment can be shut down by: a user, the run loop, a shutdown module (e.g., configured to orchestrate computing environment shutdown), and/or any other suitable system.

The suspension context can include: default continuation parameters, continuation conditions (e.g., continuation validation criteria, continuation validation information, etc.), limitations on when the run can be resumed, and/or other contextual information. The suspension context can be: global (e.g., default values for all suspensions), specified by the workflow, specified by the code block (e.g., hardcoded into the code block, calculated during code block execution, etc.), specified by the user, and/or otherwise defined. Examples of continuation validation information can include: secret key(s) enabling the requesting system to identify itself as having permission to resume the suspend event (e.g., a public key, wherein the run is associated with the corresponding private key or vice versa; a symmetric key shared between the requesting system and the run; a cryptographic key identifier, such as a pointer to a key stored in a secure enclave; etc.), validation tokens, limitations on what qualifies as a valid result value, limitations on how to receive the result value, the validation method to use (e.g., key signature, hash, proof, etc.), and/or other contextual parameter requirements.

Persistently storing the run state S400 functions to store the run state until the run can be continued again. Run state storage is preferably managed by the run loop, but can alternatively be managed by the requesting system, the user, and/or by any other suitable system. The run state is preferably stored as part of suspending the run, but can alternatively be periodically stored (e.g., backed up) during run execution (e.g., during S100-S200), stored upon request from a requesting system, and/or stored at any other suitable time. The run state is preferably stored before the computing environment is shut down, but can alternatively be stored during computing environment shut down. The run state is preferably stored to the persistent storage (e.g., nonvolatile memory, distributed memory, etc.) specified in the run configuration, but can alternatively be stored to platform storage, a blockchain, or any other suitable storage. The run state can be stored in association with the run identifier, the last execution time, and/or any other suitable run metadata. Storing the run state can include: storing the run storage object (e.g., with the set of block states therein), storing the data within the run storage object, and/or storing any other suitable representation of the run state. The compiled code blocks are preferably not stored with the run state, but can alternatively be stored as part of or with the run state.

Resuming the run S500 functions to restart execution of the workflow instance. Run resumption can be controlled by: the run loop, the requesting system, the runtime environment, another flow, and/or by any other suitable system.

The run can be resumed when a continuation condition is met, randomly, and/or at any other suitable time. Examples of continuation condition satisfaction can include: satisfaction of the default continuation parameters (e.g., timer expiration), occurrence of a continuation event, receipt of a valid continuation request, and/or any other suitable continuation condition. Examples of continuation events can include: occurrence of a real world event, hook activation (e.g., webhook activation), and/or other continuation events.

In a first variation, the run is resumed when default continuation parameters are met. For example, the run can be resumed using a default value when a predetermined duration has expired.

In a second variation, the run is resumed when a continuation request is received from a requesting system. The requesting system can be the same or different requesting system from that initializing the run, be another run, and/or be any other suitable system. The continuation request can include: a run identifier, a result value (e.g., for subsequent binding to the suspend variable, if appropriate), validation information (e.g., the provided token, a proof, a hash, a signature by the specified key, etc.), and/or other information. The result value can be received: from a user, from a datafeed, from an entity (e.g., lab results), from another workflow, and/or from any other suitable source.

In embodiments of the second variation, the run can be resumed when a valid continuation request is received (e.g., and not resumed when an invalid continuation request is received), wherein the continuation request is validated before run resumption. This can function to confer idempotency, to ensure that authorized systems are requesting run resumption (and providing run values), to ensure that the continuation request is only called once, guarding against inadvertent workflow continuation (e.g., by an improper requesting system and/or at an improper time), and/or provide other advantages. In these embodiments, a validation module can optionally verify the validity of the continuation request using the validation information in the request. In a first example, the continuation request is verified if the requesting system's identifier matches an authorized requesting system identifier associated with the run identifier. In a second example, the continuation request is verified if the correct proof is provided (e.g., calculated using the validation information, the validation method, etc. provided to the requesting system). In a third example, the continuation request is verified if the request signature (e.g., signed by a cryptographic key specified by the run) is valid. In a fourth example, the continuation request is verified if the validation information matches or is associated with a value already in the run. For example, continuation calls for runs for a healthcare or identity verification workflow can be validated by confirming that a user identifier (e.g., social security number, address, biometric measurement, etc.) or derivative information thereof (e.g., hash) provided in the continuation request substantially matches the user information stored or generated by the run.

In a specific example of these embodiments, this can include: providing a unique token (the PERMIT) or other value when invoking SUSPEND, storing the PERMIT in a location which is accessible to a subsequent CONTINUE call, optionally communicating the PERMIT to an intended client, and for the client to present the PERMIT when invoking CONTINUE. The CONTINUE function is modified to include a check that the provided PERMIT matches the expected PERMIT.

A second specific example of these embodiments leverages a proof, whereby the client would prove that they are permitted to continue the workflow at a particular point. In this variant a workflow may provide a function (e.g., a predicate) instead of a literal value as a PERMIT, and arrange for this predicate to be associated with the workflow instance. The CONTINUE method would be altered to retrieve the PERMIT function and apply it to the PERMIT value provided as an argument to CONTINUE. In this way, the system could accommodate arbitrary mechanisms for guarding against inappropriate continuation. For example, a workflow might wish to allow continuation when any one of a set of PERMIT values is presented, or in another variant, a workflow may wish to stipulate that the PERMIT value represents a signature validating the CONTINUE data using public/private key cryptography.

However, the run can be resumed when any other suitable set of continuation conditions are met.

Resuming the run S500 (e.g., restoring the run) can include: optionally provisioning a new computing environment (e.g., according to the run's stored computing environment parameters), restoring the run state for the identified run, optionally binding the result value to the suspend variable, and repeating S100-S200 (e.g., using the newly provisioned computing environment and the bound result value). For example, the runtime environment can: retrieve the run stack associated with the run identifier, determine the next stack frame in the stack, optionally bind the result value to the suspend variable (e.g., when the next stack frame includes a suspend variable), and execute the partition identified in the next stack frame S200. However, the request can be otherwise handled.

In a specific example, the client can call a system-defined operator (e.g., "continue!") with the run identifier and the result value ("result-value"). The client preferably: continues the run using the run identifier and passes a result value. The partition identified in the top frame of the run's stack is then identified (S100), the result value is bound to a suspend variable (e.g., if a suspend variable is provided in the stack frame) and added to the variable values provided in the stack frame, and the partition is executed using the set of variable values (S200). The executed partition then may push a new stack frame to the stack, and the method can be repeated for the next partition identified in the new stack frame.

In a second specific example, the system arranges for a software program to run ("the expiry program") when the current system time exceeds the earliest expiry time. The expiry program retrieves the run and calls CONTINUE using the default continuation parameter values. Thus, many different timed workflow processes may be trivially strung together, using arbitrary complex or simple logic for reattempting actions. Rather than distributing such software logic across multiple systems and bodies of code, as is the current practice, the current system provides a simple, cognitively tractable structure for controlling and coordinating many timed events.

The method can optionally include terminating the run (e.g., ending the run). Terminating the run is preferably different from suspending the run, but can alternatively be the same. Terminating the run preferably includes deleting the run state (e.g., from both volatile and/or persistent/durable memory), but can alternatively include any other suitable process. The run can be terminated: by the run loop (e.g., responsive to a result output by an executed code block), by a requesting system, by another run, and/or by any other suitable system. The run is preferably terminated when a termination event is encountered, but can alternatively be terminated responsive to any other suitable event. Examples of termination events include: receiving a termination request (e.g., from a requesting system, a run, etc.), when no more block states exist in the run storage, when an exceptional condition is encountered, when a run state is modified, and/or include any other suitable set of termination events.

The method can optionally include coordinating between multiple runs S600, which functions to transfer information between independently executing instances of different workflows (e.g., enable cross-run coordination). This can be used when multiple workflows are used together. The runs within the set can be written in the same or different programming language, be instances of the same or different workflow, and/or be otherwise related. The runs within the set can be: manually determined, dictated by the run's workflow (e.g., by a run's code block, wherein a parent run can initialize a child run, etc.), automatically determined (e.g., wherein the data processed by the runs share a common attribute, such as a common user identifier, etc.), and/or otherwise determined.

Cross-run coordination can be controlled by: one or more runs within the set (e.g., wherein a run or code block therein calls a coordination function, such as during S200), a coordination manager, a set of coordination modules, and/or by any other suitable system.

The runs can coordinate with each other through one or more shared storage objects (e.g., shared storage, coordination storage, etc.). For example, a first run can write a value to the shared storage, and a second run can read the value from the shared storage (e.g., for subsequent use in the second run, such as by binding the value to a variable in the second run's next code block). The value can be unaddressed to any recipient runs, be addressed to a recipient run, and/or be otherwise addressed. However, the runs can directly coordinate with each other (e.g., send a value to a predetermined run), and/or otherwise interact with each other.

The shared storage can be maintained in: a run's computing environment, a separate computing environment, and/or in any other suitable computing environment. The shared storage can remain online after one or more runs within the associated run set are suspended (e.g., paused, shut down, etc.), but can alternatively be suspended when one or more (e.g., all) of the runs within the associated run set are suspended, be resumed when a resumption condition is met (e.g., a requesting system restores the shared storage or run set; when one or more runs from the run set are resumed; etc.), and/or otherwise managed. The shared storage is preferably persistently stored (e.g., in nonvolatile memory, in a distributed computing system, etc.), but can be otherwise stored. The shared storage can be identified using a shared storage identifier, which can be locally unique, globally unique, nonunique, and/or otherwise unique. The shared storage identifier is preferably associated with the run identifiers of the runs within the associated run set, but can alternatively be independent of the run set.

The shared storage preferably includes a value store (e.g., that runs read and/or write to/from), and can additionally or alternatively include: run queues (e.g., source queue, sink queue, etc.), and/or any other suitable component.

The runs can determine which shared storage to interact with by: creating the shared storage instance, receiving the shared storage identifier as a variable value (e.g., provided by the requesting system, another run, a parent run initializing the run, etc.), having the shared storage identifier hardcoded into the run code block(s), and/or otherwise identifying which shared storage to interact with. Each run can interact with one or more shared storage instances, and each shared storage instance can interact with one or more runs. The runs within a run set can interact with the same set of shared storage instances, or interact with different shared storage instance sets (e.g., different subsets of the shared storage instance set).

The runs can interact with the shared storage via a set of coordination operations (e.g., as discussed above), which can specify the coordination logic for when and/or what a run can: read from shared storage, write to shared storage, suspend execution, restart execution, and/or otherwise control a run.

Coordinating between multiple runs S600 can include: initializing a shared storage instance ("channel"); interacting with the shared storage instance when a coordination operation is encountered S630; resuming a next run when a run resumption condition is met S650; and suspending the run when a run suspension condition is met S670. One or more of the processes can be repeated for the same or different runs. This is preferably performed by each run in the run set, but can alternatively be performed by a higher-level run coordinator, or by any other suitable system. However, cross-run coordination can be otherwise accomplished.

Initializing a shared storage instance ("channel") functions to create an instance of shared storage that can be used to communicate between different runs. The shared storage can be initialized by: a requesting system (e.g., client), a run (e.g., wherein the run's code calls a shared storage initialization function), be initialized by default for each run or set thereof, and/or otherwise initialized. The shared storage can have a set of shared storage configurations, which can dictate how runs interact with the storage and/or how the shared storage is operated. The shared storage configurations can be specified by the initializing system, by default, and/or otherwise specified. The shared storage configurations can include: the number of values permitted in the shared storage (e.g., the buffer length), a value cutoff (e.g., used to determine whether a writing run should be suspended), read logic, write logic, queue logic, exception handling, the shared storage identifier, and/or any other suitable information.

Interacting with the shared storage instance when a coordination operation is encountered s630 functions to interact with other runs (e.g., via the shared storage instance). Coordination operations can include: writing values to the shared storage, reading values from the shared storage, determining the shared storage state, determining which runs have interacted with the shared storage, determining the run queue states, and/or otherwise interacting with the shared storage.

Writing values to the shared storage functions to provide values to other runs. The value is preferably written by a writing run (e.g., source run), more preferably by a code block in the writing run, but can alternatively be written by an external system (e.g., the requesting system, the client, a third party database or event stream, etc.) and/or by any other suitable system. For example, a code block (e.g., partition) within a writing run can call a "put( )" function, which writes the value passed in the put( ) function to the shared storage. Value writing to the shared storage can be: unrestricted or restricted (e.g., by a set of writing logic, etc.).

Reading values from the shared storage functions to obtain values from other runs. The value is preferably read by a reading run (e.g., sink run), more preferably by a code block in the reading run, but can alternatively be read by an external system (e.g., the requesting system, the client, a third party database or event stream, etc.) and/or by any other suitable system. For example, a code block (e.g., partition) within a reading run can call a "take( )" (or "takeany( )") function, which reads a value from the shared storage (and/or any shared storage instance that satisfies the read logic). The value can be: the most recent value, the oldest value, a value addressed to the reading run, a value written by a specific run, and/or any other suitable value. Value reading from the shared storage can be: unrestricted or restricted (e.g., by a set of reading logic, etc.). The read value can be removed from the shared storage, retained by the shared storage, and/or otherwise managed by the shared storage. When a run reads the value, the run can bind the value to a variable (e.g., the suspend variable, another variable) within the run. For example, the value can be bound to a variable of the next code block (e.g., in the run's S200), wherein the next code block is executed using the value. However, the read value can be otherwise used.

However, shared storage instance interaction can be otherwise performed.

In variants, interacting with the shared storage instance can optionally generate a coordination output. The coordination output is preferably generated based on the shared storage state (e.g., size, age, etc.), but can alternatively be generated based on the run set state and/or any other suitable information. The coordination output can include: a suspend signal, a run resumption request, and/or any other suitable output. The coordination output is preferably generated according to the coordination logic (e.g., the read logic, the write logic, etc.), but can alternatively be otherwise generated.

For example, the coordination logic can output a suspend signal (e.g., for the run) when: the shared storage exceeds a predetermined size (e.g., specified by the shared storage configuration); when a run is attempting to write to a full shared storage; when a run is attempting to read from an empty shared storage; and/or when other suspension conditions are met.

In another example, the coordination logic can determine a run identifier for a previously-suspended run and generate a run resumption request for the run identifier (e.g., optionally with a value from the shared storage) when a set of resumption conditions are met. The set of run resumption conditions (e.g., continue logic) can include: freeing up space in the shared storage (e.g., after a run reads a value from the shared storage); values appearing in the shared storage; and/or other conditions. In a specific example, a writing run can be resumed when the shared storage size falls below a threshold value (e.g., specified in the shared storage configuration). In a second specific example, a reading run can be resumed when a value appears within the shared storage.

However, any other suitable coordination output can be generated by any other suitable coordination logic.

Suspending the run S670 functions to automatically suspend a run. The run is preferably the run that is attempting to interact with the shared storage, but can alternatively be another run. The run is preferably suspended as discussed above (e.g., when a suspend event is detected), but can additionally or alternatively be suspended when the coordination output is a suspend signal, and/or when any other suitable run suspension condition is met (e.g., suspend logic is satisfied). S670 can be the same as or different from S300. For example, a run can attempt to interact with the shared storage, wherein the coordination logic generates (e.g., returns) a suspend signal. The run is suspended in response to receipt of the suspend signal. However, the run can be otherwise suspended.

Resuming a next run when a run resumption condition is met S650 functions to automatically resume a previously-suspended run. The next run is preferably another run (e.g., different from that attempting to interact with the shared storage), but can alternatively be the same run. The next run can be resumed when a set of run resumption conditions are met (e.g., as discussed above), be resumed when a requesting system calls the run, and/or at any other suitable time. Resuming the run can include: identifying the next run, retrieving a value from the shared storage, and executing a run resumption request with the identifier for the next run, the value, an identifier for the shared storage (and/or run set), and/or any other suitable information. The value is then bound to a variable in the next run, wherein the next run is executed using the bound variable.

The next run can be identified from: a set of run queues, the value, and/or otherwise identified. The next run can be identified by the coordination logic, by the run (e.g., attempting to interact with the shared storage), and/or by any other suitable system.

In a first example, the next run can be identified from a source queue storing run identifiers for runs that unsuccessfully attempted to write to the shared storage. In a specific example, the next run can be identified from the source queue when the shared storage size falls below a threshold (e.g., the number of values within the shared storage falls below a threshold). However, runs can be otherwise identified from the source queue.

In a second example, the next run can be identified from a sink queue storing run identifiers for runs that unsuccessfully attempted to read from the shared storage. In a specific example, the next run can be identified from the sink queue when the shared storage size exceeds a threshold (e.g., 0; when a value appears within the shared storage; etc.). However, runs can be otherwise identified from the sink queue.

In an illustrative example of cross-run coordination, a workflow in one run creates a channel, and optionally configures it (e.g., sets the size of the data buffer). The workflow then arranges for a reference to the channel to be passed to a second workflow instance, such as by creating the second workflow instance and passing the channel reference to it as a starting argument, but any means of communicating the channel to the second workflow is acceptable. Once one or more workflow instances have access to a shared channel reference, any of them may attempt to PUT or TAKE data from the channel. For example using PUT (channel-id, data) or TAKE (channel-id). A channel may optionally include a FIFO buffer (the "data buffer" or simply "buffer") that includes zero or more slots for holding data. The channel may optionally include a sinks queue and a sources queue.

In this illustrative example, a PUT operation suspends the calling workflow instance when the channel's buffer is full, but returns without suspending when either the buffer has space for data or at least one workflow instance is waiting for data (due to calling TAKE on the channel). In the latter case, the PUT operation continues the suspended workflow instance, passing the data to CONTINUE. Conversely, a TAKE operation suspends the calling workflow instance when the channel's buffer is empty, but returns a value from the channel when the channel contains data in the buffer (as provided by prior a PUT operation) and continues a workflow instance previously suspended by PUT (providing no data or a null value).

In a specific example, a channel is a data structure which holds one or more queues, preferably (1) a sinks queue, for recording which workflow instances (e.g., by storing workflow identifiers) are currently awaiting data from the channel (2) a buffer, representing data which is available and can immediately be retrieved from the channel, and (3) a sources queue which records workflow instances (e.g., by storing workflow identifiers) which have data to provide to the channel, and optionally record the data being provided by the workflow instance to the channel. A channel may be configured with optional capacity limits for the buffer, the sinks queue and/or the sources queue. However, the channel (e.g., shared storage) can be otherwise configured.

In this illustrative example, to implement the forgoing, the workflow system can include the channel data structure described above, and two suspending functions: PUT and TAKE to put data into or take data out of channels. The system can be modified to ensure that the channel data structure is stored separately from the workflow instance in durable storage. This is useful for minimizing the data retrieval requirements during a runlet by allowing the system to load only channels and workflow instances required during a runlet from durable storage.

When a workflow instance attempts to PUT a value into a channel, if the channel's sink queue is not empty, a workflow identifier is removed from the queue and the associated workflow is continued providing the value to the CONTINUE method. Otherwise, the value is added to the channel's buffer. If the buffer exceeds a capacity limit configured in the channel, the current workflow instance's identifier is added to the channel's sources queue, and a suspend signal is generated, causing the current workflow instance to suspend. When a workflow instance attempts to TAKE a value from a channel, if the channel's buffer contains values, a value is removed from the buffer and returned. If the channel's sources queue is not empty, a workflow identifier is taken from the sources queue and the associated workflow is continued, as with CONTINUE. If the channel's buffer does not contain values, the current workflow instance's identifier is added to the channel's sinks queue and a suspend signal is generated.

In another variant of this illustrative example, a method TAKEANY allows for multiple channels to be provided as an argument (e.g., TAKEANY (c1, c2, c3 . . . )). TAKEANY suspends the current workflow instance when every passed channel has an empty buffer, and allows for continuing the first workflow instance when any of the passed channels is provided data (e.g., with PUT). TAKEANY may be implemented as a flow which (when all channels have empty buffers) adds the current workflow instance id to the sinks queues of all the passed channels, generates a suspend signal. After a corresponding PUT on one of the channels, the TAKEANY flow resumes, capturing the value from the channel (which it eventually returns) and removing the current run's identifier from the sinks queues of the other channels.

Thus, many variations of asynchronous workflow communication and coordination are possible by extending a suspending stack-based workflow system with one or more of the following: (1) conduits (such as the aforementioned channels) which optionally store arbitrary programmatic values for transmission between workflow instances and/or store workflow instance identifiers (e.g., workflows which are waiting to receive or transmit data through the conduit or are otherwise wish to coordinate through the conduit), and or store other configuration data (e.g., buffer constraints), (2) methods for adding, removing or viewing values from conduits which may suspend or return values depending on whether certain conditions are met and which may alter the contents of the conduit (e.g., adding or removing workflow instance ids to the conduit or adding or remove data values to or from the conduit, or otherwise altering the conduit), (3) arranging for retrieval from durable storage of one or more conduits preferably at the beginning of a runlet and storage of the conduits at the end of the runlet, and (4) preferably storing conduits separately from workflow instances that hold a reference to them. While the examples shown in prior paragraphs involving channels, TAKE, PUT and TAKEANY operations use a specific set of FIFO queues, constraints and rules for when to suspend or continue workflows, many other useful variants may be implemented. However, the workflow can be otherwise executed.

Figure 15:
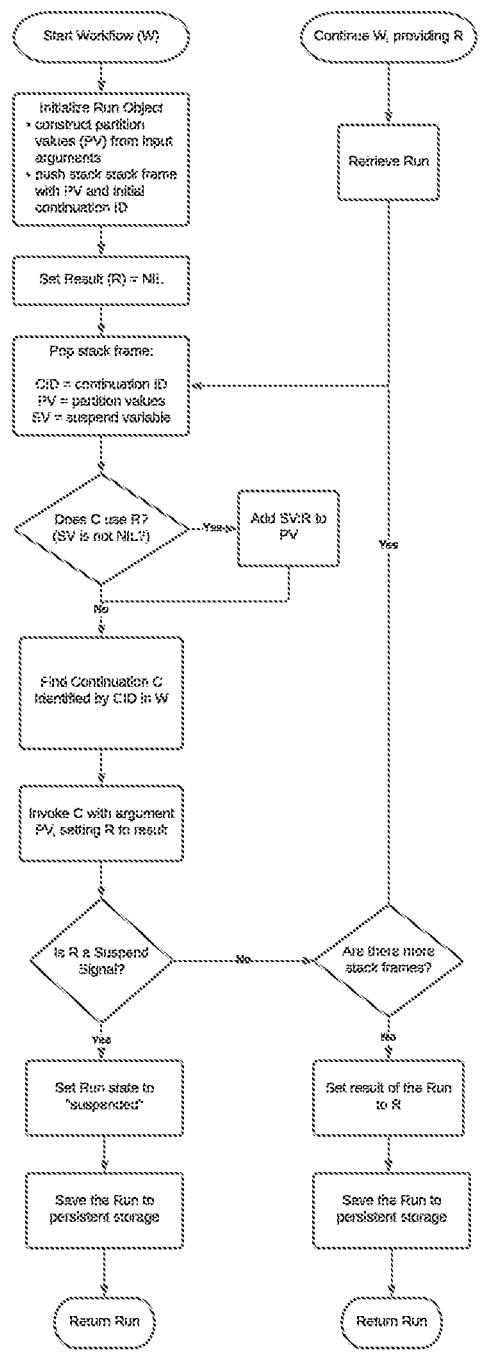
FIG. 15 is a schematic representation of a specific example of workflow execution.

In a specific example (example shown in FIG. 15), executing a workflow (e.g., with a runtime environment) includes: receiving a request to execute the workflow (e.g., from a client), optionally with input arguments; initializing a run, including constructing partition values from the input arguments and pushing a stack frame to the stack with the first address (for the workflow's first partition; "start address"; etc.) and the partition bindings (e.g., binding the input argument values to the partition variables); evaluating whether a suspend event has occurred; when a suspend event has not occurred, popping the next stack frame from the stack (e.g., the top stack frame), optionally binding value(s) returned by the executed partition to the next partition's variable(s) (e.g., suspend variables), and executing the next partition identified in the popped stack frame; and when a suspend event has occurred, storing the stack to persistent storage (e.g., durable storage) and optionally shutting down the process executing the run. The values output by the executed partition can optionally be returned (e.g., when no next partitions are identified or available). The new bindings created in the executed partition are preferably not propagated to the next partition's variable value bindings (e.g., the runtime environment does not replace the next partition's variable value bindings with the previously-executed partition's variable value bindings, except for the suspend variable); alternatively, the bindings (e.g., all bindings, only bindings needed by the next partition, etc.) are propagated. In an example, evaluating whether a suspend event has occurred can include determining whether the partition in the next stack frame has an unbound suspend variable. When it does, the method can include determining whether a result (e.g., received from an external input or defined by another partition) is available for the suspend variable, bind the suspend variable to the available result value, and treating the suspend variable-result binding as a partition binding when the result is available for the suspend variable. In some variants, when no result is available for the suspend variable, the suspend event can be detected, and the run suspended. In other variants, either a suspend variable value is returned or a suspend signal is returned. In another example, evaluating whether a suspend event has occurred can include evaluating whether the returned value is a suspend signal. When the returned value is a suspend signal, the method can suspend the run state, save the run to persistent storage, and return the run (in addition to any values associated with the suspend signal, such as default continuation conditions, etc.) to the client. When the returned value is not a suspend signal, the method can determine whether there are more stack frames. When there are more stack frames, the method can be repeated from popping the next stack frame from the stack and repeating the method. When there are not more stack frames, the method can store the current result value as the result of the run, save the run to persistent storage, and return the run (optionally with the result of the run) to the client. At this stage, the run may be considered to be in a "final" or "complete" state, at which point the CONTINUE function behavior might return an error or otherwise refuse to modify the run.

In another example, executing a workflow includes iteratively: retrieving an identified partition, executing the identified partition using passed variable values, wherein identified partition execution generates outputs and writes one or more frames (e.g., block states) including an identifier for the next partition, partition variable values (e.g., bound to the partition variables), and optionally an unbound suspend variable for capturing the result of a suspending expression to a stack; determining the next frame from the stack; binding a result value from the output to a suspend variable of the next frame; and repeating the method (e.g., steps described above) until a suspend event is encountered (e.g., a suspend signal is generated, a suspend signal is output in the output); suspending run execution responsive to suspend event occurrence; receiving a request to resume the run with a result value; restoring the run responsive to the request; determining the next frame in the (restored) stack; binding the result value to the suspend variable in the next frame; and resuming the method.

Figure 17:
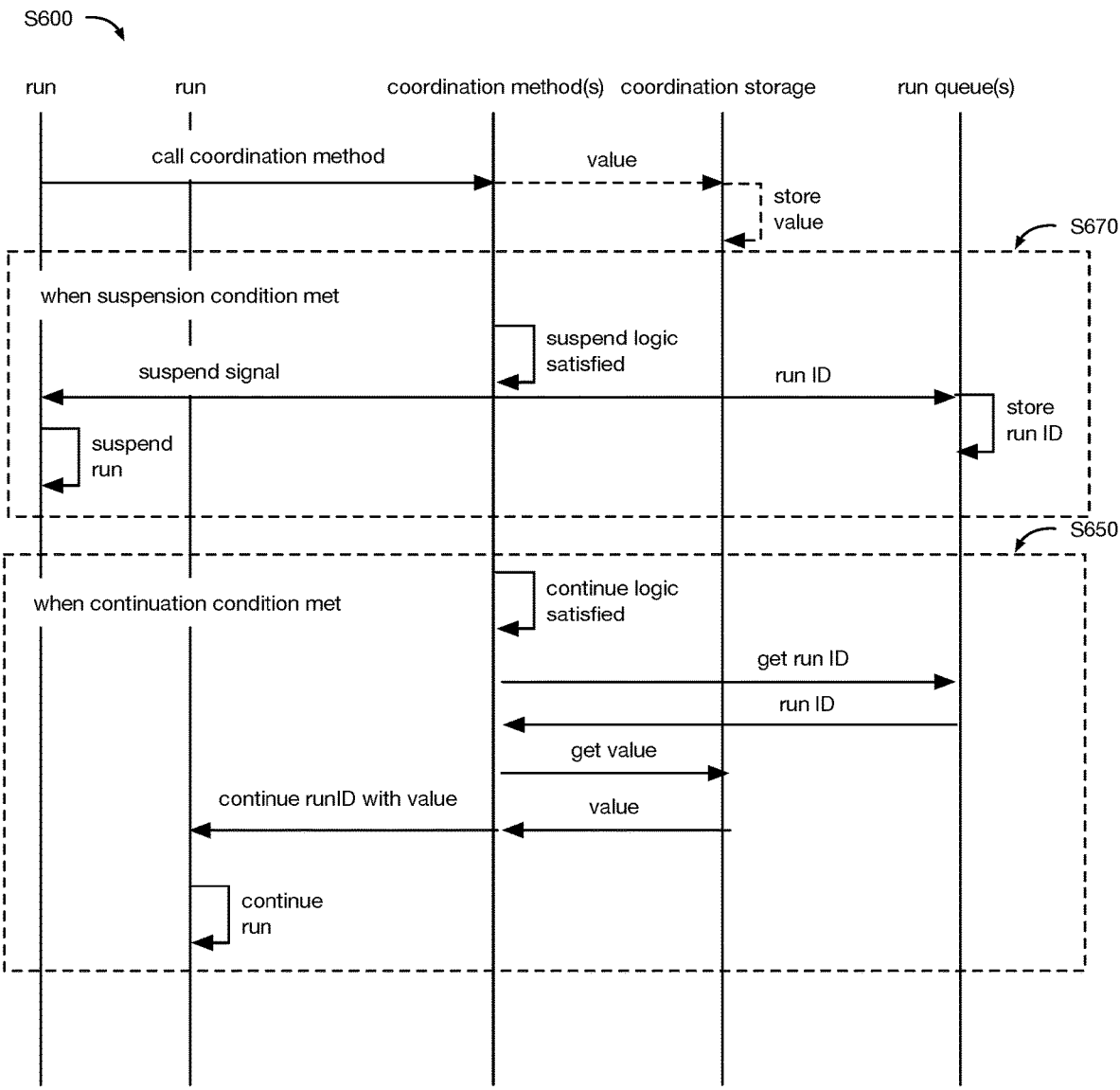
FIG. 17 is a schematic representation of an example of cross-run coordination.

In a third example, the method can include executing a set of runs (e.g., as discussed above); with a first run, interacting with a channel (e.g., shared storage) shared between the set of runs; and evaluating whether to suspend the run according to a set of coordination logic (e.g., example shown in FIG. 17). The interaction can include reading a value, writing a value, or other interaction. When the interaction satisfies a set of suspend logic, a suspend signal can be returned to the first run, wherein the first run detects the suspend event and suspends. When the interaction satisfies a set of continue logic, a suspend signal is not returned to the first run. Optionally, when the interaction satisfies the set of continue logic, a second, previously-suspended run identifier can be identified from a run queue for the channel, a value can optionally be read from the channel and bound to a variable for a partition within the second run, and the second run can be restored and executed. Alternatively, values can be directly sent between the runs of the set.

In a fourth example, the method can include: modifying existing programming languages, such as by utilizing existing exception handling mechanisms. For example, a programming language could be modified (e.g., by rewriting the language, by providing translation modules, by providing custom compilers, etc.) to permit a special exception to be generated at any point in a program; for the programmatic state (e.g., the programmatic stack and other values pertaining to the dynamical runtime environment) at the point in the code where the exception was generated to be captured (e.g., access a Javascript event queue); for that state to be persisted to durable storage; for that program state to be regenerated at a later time; and for a value to be provided to continue the computation at the point the special exception was generated, whereby the exception-generating statement is replaced with the value. This could be achieved, for example, by wrapping the exception generating statement with a try/catch block and handling persistence and regeneration of the programmatic state within a catch handler block. However, this functionality can be otherwise achieved.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

I claim:

1. A set of instructions stored by a non-transitory computer-readable storage medium that, when executed by a processing system, cause the processing system to perform a method comprising:
   executing each of a set of runs, comprising:
   a) executing a code block from a series of code blocks associated with the run;
   b) during code block execution:
      storing block states to run-specific storage when an asynchronous operation is encountered;
      suspending the run when a suspension command is generated; and
      interacting with coordination storage shared across the set of runs when a coordination operation is encountered, wherein a suspension command is generated when the shared storage interaction satisfies a set of suspension conditions;
   c) when the code block does not suspend the run, repeating a) and b) for a subsequent code block within the series;
   d) when the code block suspends the run, storing the block states in the run-specific storage to persistent storage; and
   e) restoring the block states and repeating c) when a continuation condition is met.

2. The method of claim 1, wherein interacting with shared storage comprises at least one of writing to the coordination storage or reading from the coordination storage.

3. The method of claim 1, wherein the coordination storage comprises a plurality of buffers, wherein the code block specifies which buffers from the plurality to interact with.

4. The method of claim 1, wherein the set of suspension conditions comprises a number of values stored in the coordination storage exceeding a threshold size.

5. The method of claim 1, wherein the set of suspension conditions comprises an empty coordination storage.

6. The method of claim 1, wherein storing code block states to run-specific storage is natively performed according to a programming language for the code block.

7. The method of claim 1, wherein storing block states to run-specific storage comprises writing a frame, comprising a persistent identifier for another code block, a set of values, and a set of variables to the run-specific storage, wherein the subsequent code block is identified based on a next frame from the run-specific storage.

8. The method of claim 1, wherein the continuation condition comprises a client calling the run with a return value, wherein the subsequent code block is executed using the return value.

9. The method of claim 8, wherein e) is performed after the return value is validated.

10. The method of claim 1, wherein the continuation condition comprises another run of the set calling the run with a value from the shared storage.

11. The method of claim 10, wherein the other run calls the run with a value from the shared storage when the shared storage exceeds a threshold size and an identifier for the run is within a sink queue.

12. The method of claim 1, wherein the continuation condition comprises satisfaction of a default condition associated with a default value, wherein the subsequent code block is executed using the default value.

13. The method of claim 1, wherein a runtime environment executing a run is torn down after the code block suspends the run.

14. A system, comprising:
a set of workflows, wherein each workflow comprises a set of code blocks; and
a run module, executing on a set of processing systems, that is configured to execute a run, comprising:
executing a code block from a set of code blocks;
storing block information to run storage during code block execution, wherein the block information comprises: a persistent identifier for another code block; a set of variables from the code block; and a set of values bound to at least a subset of the set of variables;
identifying a subsequent code block from the block information stored in run storage to execute when the code block does not suspend the run; and
storing the run storage to persistent storage when the code block suspends the run.

15. The system of claim 14, wherein executing the run further comprises:
returning a return value after code block execution; and
binding the return value to a variable of the set of variables; wherein the other code block is executed using the return value.

16. The system of claim 14, wherein the run executes in a run loop, wherein the subsequent code block is identified when the code block does not suspend the run loop, and wherein the run storage is stored to persistent storage when the code block suspends the run loop.

17. The system of claim 14, further comprising a set of coordination modules, executing on a set of processing systems, that are configured to control communication of values across runs.

18. The system of claim 17, wherein the coordination modules comprise a set of suspension conditions, wherein a suspension command is generated when the set of suspension conditions are satisfied.

19. The system of claim 18, wherein the values are stored in coordination storage shared across runs, wherein the set of suspension conditions comprises a number of values stored in the coordination storage exceeding a threshold size.

20. A system, comprising:
a set of workflows, wherein each workflow comprises a set of code blocks; and
a run module, executing on a set of processing systems and configured to execute a run, comprising:
executing a code block from a set of code blocks;
storing block information to run storage during code block execution;
identifying a subsequent code block from the block information stored in run storage to execute when the code block does not suspend the run; and
storing the run storage to persistent storage when the code block suspends the run, wherein the run storage does not comprise compiled code.

21. A system, comprising:
a set of workflows, wherein each workflow comprises a set of code blocks; and
a run module, executing on a set of processing systems and configured to execute a run, comprising:
executing a code block from a set of code blocks;
storing block information to run storage during code block execution;
identifying a subsequent code block from the block information stored in run storage to execute when the code block does not suspend the run; and
storing the run storage to persistent storage when the code block suspends the run; and
a set of coordination modules, executing on a set of processing systems and configured to control communication of values across runs, wherein the values are stored in coordination storage shared across runs; and wherein the coordination modules comprise a set of suspension conditions, wherein a suspension command is generated when the set of suspension conditions are satisfied, wherein the set of suspension conditions comprises a number of values stored in the coordination storage exceeding a threshold size.

\* \* \* \* \*